United States Patent [19]

Farina et al.

[11] Patent Number: 4,704,699

[45] Date of Patent: Nov. 3, 1987

[54] DIGITAL FILM RECORDER, PERIPHERAL, AND METHOD FOR COLOR HARDCOPY PRODUCTION

[75] Inventors: John J. Farina, Beverly Hills; Takeo Z. O'Ishi, Los Angeles, both of Calif.

[73] Assignee: Bell & Howell Company, Chicago, Ill.

[21] Appl. No.: 624,512

[22] Filed: Jun. 25, 1984

[51] Int. Cl.[4] .......................... G09G 1/28; H04N 9/79
[52] U.S. Cl. ..................................... 364/525; 340/703; 340/720; 358/332; 364/526; 346/11 OR
[58] Field of Search ................ 364/525, 526; 358/334, 358/244, 332, 78; 340/702, 703, 720; 346/11 OR, 11 OV

[56] References Cited

U.S. PATENT DOCUMENTS

| | | | |
|---|---|---|---|
| 3,594,759 | 7/1971 | Smura | 346/11 OR |
| 3,815,094 | 6/1974 | Smith | 346/11 OV |
| 4,112,459 | 9/1978 | Gautier et al. | 358/332 |
| 4,373,156 | 2/1983 | Pfannkuch et al. | 358/332 X |
| 4,467,369 | 8/1984 | Alston | 358/332 |
| 4,473,849 | 9/1984 | Cool | 358/332 |
| 4,475,161 | 10/1984 | Stock | 358/334 X |
| 4,481,542 | 11/1984 | Goldberg | 358/332 X |
| 4,488,244 | 12/1984 | Freeman | 364/525 |
| 4,492,987 | 1/1985 | Burkhardt et al. | 358/332 |

Primary Examiner—Felix D. Gruber
Assistant Examiner—Kevin J. Teska
Attorney, Agent, or Firm—Robert B. Block

[57] ABSTRACT

A digital film recorder, peripheral and method adapted to receive high level digital command instructions from a host computer or terminal and to develop a color hardcopy therefrom without further graphics instructions. It includes a digital input interface, local computer ROM and RAM, and a display controller for developing the graphics to be stored in a display memory. A lookup memory exchanges data between the display memory, the local computer, and the display controller and contains user preassigned color and brightness information. The output consists of a video and sync signal which may be either alternating RGB or simultaneous RGB delivered to an analog film recorder preferably incorporated as an integral part of the unit. Print command control is direct from the output of the host computer to the digital input of the digital film recorder.

14 Claims, 10 Drawing Figures

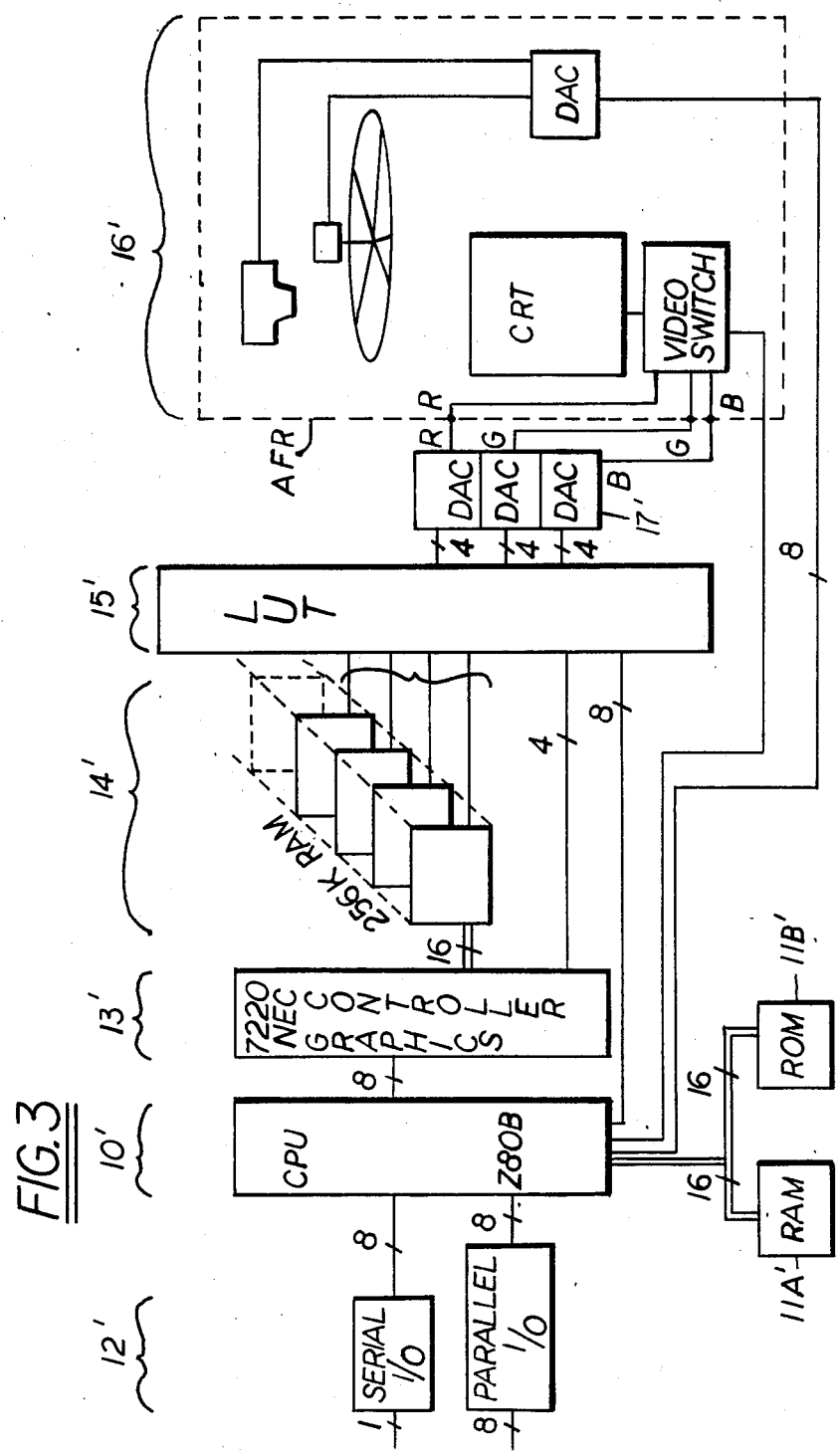

PRIOR ART

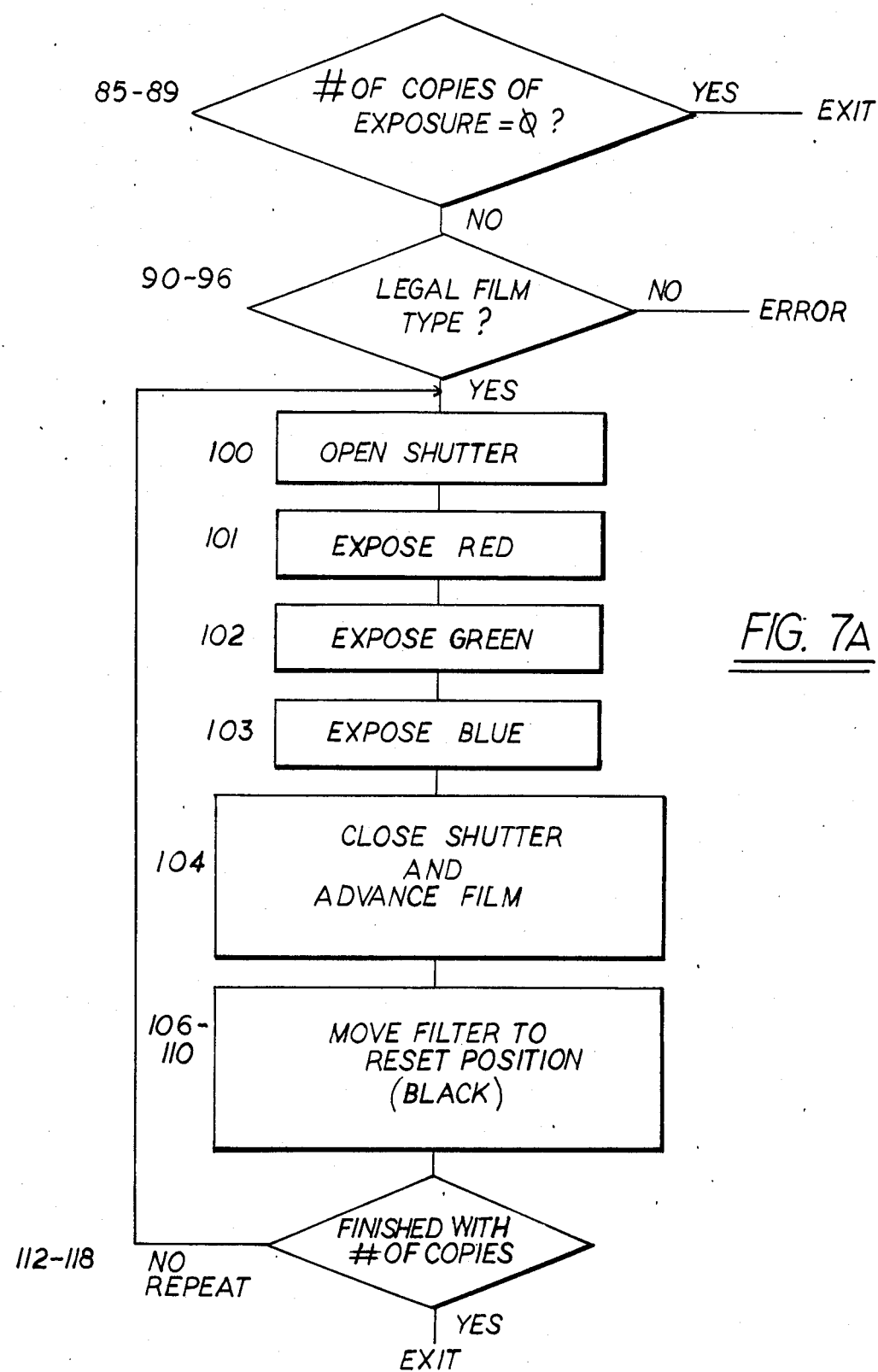

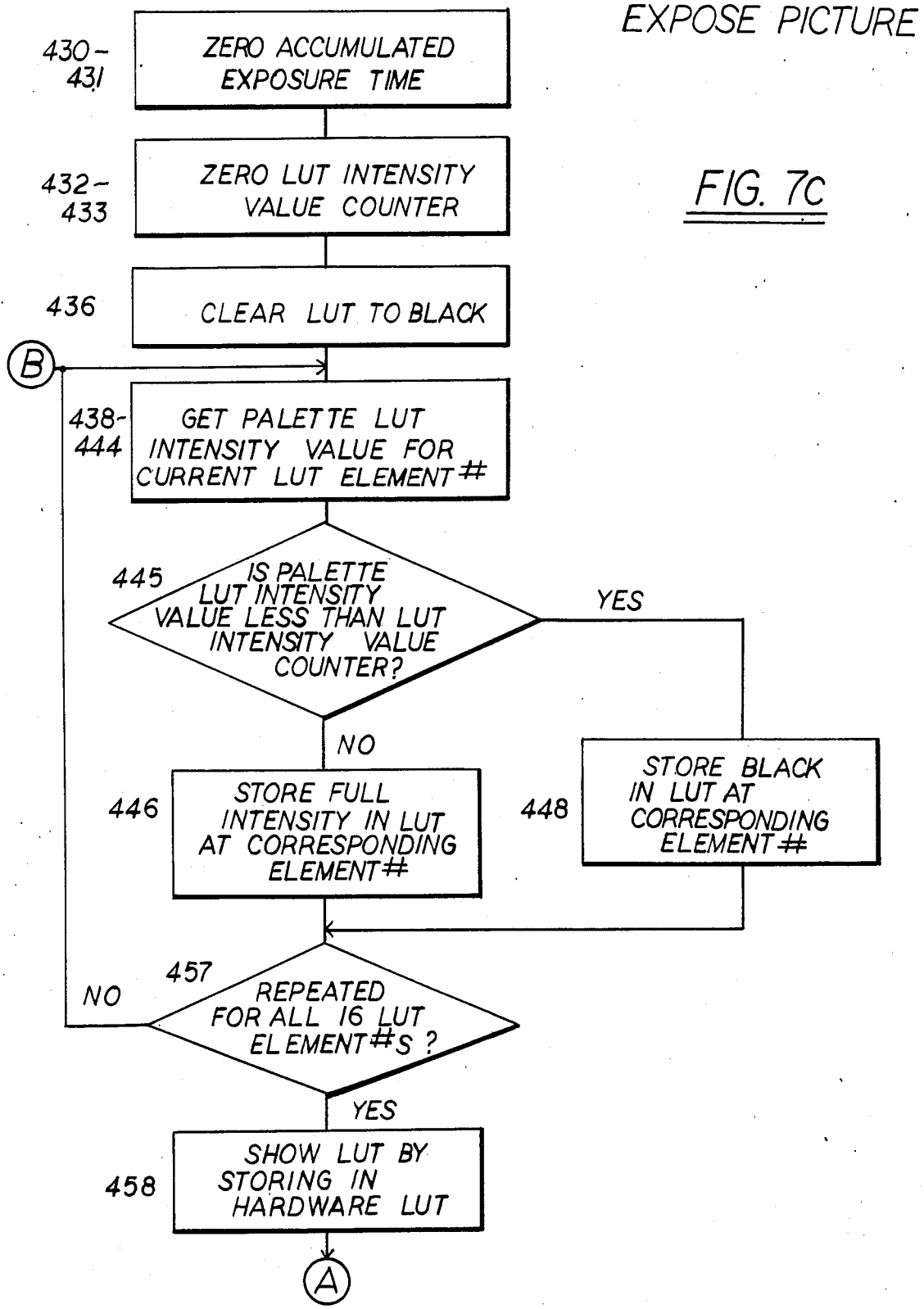

DIGITAL FILM RECORDER, PERIPHERAL, AND METHOD FOR COLOR HARDCOPY PRODUCTION

BACKGROUND OF THE INVENTION

This invention relates to computer graphics and more particularly to an improved film recorder which can serve as a stand alone peripheral and to the method.

Prior computer graphics systems have contained (1) a computer or central processing unit, (2) a graphics display generator which takes commands from the host computer and generates the graphic image usually in the form of a red, blue and green video analog signal for use by a color CRT, (3) a color CRT for viewing the graphics image, and (4) some sort of a hardcopy film recorder device.

Such prior art systems have been expensive, require analog input to the film recorder, and are not adapted for full digital interconnections. They have been based on the use of several independent components using redundant hardware, have failed to achieve the full efficiency of an integrated systems approach, have not been fully computer controlled from the host computer, do not lend themselves to multi-user environments or applications, and require video signal interconnections.

There is therefore a need for an improved graphics system to overcome these limitations.

OBJECTS AND SUMMARY OF THE INVENTION

In general, it is an object of the present invention to provide a new form of peripheral hardcopy graphics device and method together with subcomponents thereof which operates directly from host computer high level commands in digital form to provide color hardcopy.

A further object is to provide a peripheral and method of the above character which eliminates the need for color graphics generation in the host computer and eliminates the need for video signal transmission between components.

A further object of the invention is to provide a peripheral and method of the above character which permits the host or user computer to operate by spooling so as to free the host or user computer for other operations.

A further object of the invention is to provide a peripheral and method of the above character which can be configured for multiple user access as a signal digital film recorder peripheral attached to a system.

Another object of the invention is to provide a peripheral and method of the above character which is not dependent on a host computer for the resolution of the graphics and therefore can generate very high resolution graphics from high level commands.

A further object of the invention is to provide a stand alone hardcopy color pheripheral.

The following is a brief summary of the organization and operation of the present invention as a stand alone peripheral based on incorporation within it of a Polaroid Corporation Palette model computer image recorder.

The invention is a digital film recorder (DFR) which includes a graphics display generator (herein termed GDG) combined with an analog film recorder (AFR). The GDG is a graphics display generator with dual 16 location color lookup tables. The DFR accepts digital information via an RS232C serial port or parallel port. The digital commands are processed by an on-board Z80 CPU and converted to raster form in the display memory. The display memory is converted to RGB video via the NEC 7220 processor. The RGB video shows the rasterized information on a color CRT screen. The LUT allows for 16 values of red, green and blue for a total of 4096 possible colors.

Analog Film Recorder (AFR) Description

The AFR is a stand alone film recorder which accepts a monochrome video with sync and displays a monochrome image on a CRT to expose the film with a camera. The video is shown with no gray levels. A filter wheel with red, green and blue filters rotates in front of the camera lens to expose the three colors separately onto the same shot. The camera shutter and the filter wheel are controlled with a DAC which may be implemented with an Intel 8748 device.

Graphics Display Generator Description

The GDG is hooked up to the AFR with the green video only from the GDG (with sync) to the AFR video input. The GDG driver controls the AFR by sending digital commands to the AFR while displaying the image in green. The following is a summary of the entire exposure procedure:

The process is done by comparing all of the values in the green LUT elements (because the red, green and blue are all placed in green before this process is called) with values from 0 to 15. If the LUT element is greater than the current value being exposed, then the LUT element that contains this value is set to the maximum intensity. The maximum intensity is needed by the AFR to show an "on" image since there are no gray levels. This procedure exposes the film as specified by the film exposure table for this current value then continues to the next value up to the final value of 15. As this procedure continues toward 15, each element which is no longer greater than the current value is turned "off" by receiving the minimum intensity value. This avoids these areas from being exposed since they are to be darker than the higher valued elements. The exposure table contains the actual exposure time needed to expose the corresponding value. Therefore, in order to obtain the "real" amount of time needed to expose that value, the difference of the new exposure value and the accumulated exposure time so far must be calculated. For example, if the image contained black on the left, gray on the middle and white on the right, the following will occur in order to expose this image: The right side of the image will show maximum intensity green. This will be exposed as red. Then both the middle and right sections will show maximum intensity green. This will be again exposed as red. Then the same will occur for green and blue filters. In this way, the black area never receives ANY exposure, the middle area (gray), receives some red, green and blue exposure times, and the right area (white), receives the most amount of red, green and blue exposure times which gives the correct end result.

The following is a description/explanation of the flow chart:

1. Number of copies of exposure=0.

The DFR has the feature of making multiple exposures from one image. If this counter is set for zero by the user, the exposure command has no effect.

2. Legal film type.

The DFR currently supports 3 film types. Each film has different exposure times. The user must select which type of film he/she is using before exposing the film.

3. Open the camera shutter.

This is a command sent from the DFR to the AFR. This causes the camera shutter to open and remain opened.

4. Expose red (see below).
5. Expose green (see below).
6. Expose blue (see below).
7. Close shutter and advance film.

This is a command sent from the DFR to the AFR. This causes the camera shutter to close and the electric motor in the camera advances the film for the next exposure.

8. Move filter to reset position.

This is a command sent from the DFR to the AFR. This causes the filter wheel to turn to the black position so that accidental exposures cannot occur.

Expose Red, Green and Blue

To do the actual exposure, the following steps are done for each of red, green and blue (where "color" is replaced by red, green or blue):

1. Move to correct filter.

This is done so that the monochrome image on the CRT will pass through the correct color filter and expose the film in that color.

2. Move "color" AFR LUT to green AFR LUT.

This is done to output the "color" out of the green (and sync) video line to the monochrome video input since only the green video is connected from the DFR to the AFR.

3. Obtain correct exposure value table address from film type.

The exposure times are different for different film types. Therefore the DFR is commanded by the user to use a specified type of film. The DFR "remembers" this film type and when it is time to expose the picture, the correct table for the film type must be used.

4. Expose picture (see below).
5. Reset LUT to original values.

This is done to restore the original image.

Expose Picture

1. Zero accumulated exposure time.

For each exposure of red, green and blue, the accumulated exposure time must be "remembered" so that the actual time to expose can be calculated from the difference between new exposure value and the accumulated exposure time. Therefore, to begin, this value must be set to zero since no time has accumulated.

2. Zero LUT intensity value counter.

This counter counts from 0 to 15 and is compared against the values in the LUT. Note that the actual value of "0" in the LUT specifies the maximum intensity for output and the value of "15" in the LUT specifies the minimum intensity. Therefore, by starting this counter at zero, the procedure will expose the maximum intensity areas first, followed by the lesser intense areas, all the way to black.

3. Clear LUT to black.

This is done to get rid of the red and blue colors on the image. This is done so that if the connection from the AFR to the green video on the DFR was mixed up and connected to red or blue, the images will be completely black as opposed to some random garbage images.

4. Get AFR LUT intensity value for current LUT element number. This is the start of the loop which checks all 16 elements of the LUT for values that should be exposed.

5. Is AFR LUT intensity values less than LUT intensity value counter?

As explained above, if the current LUT intensity value is less than the value counter in the loop, this LUT element will be changed to the minimum intensity value (black) so that the area on the image which corresponds to this LUT element will not be exposed. Otherwise the maximum intensity value will be stored in the corresponding LUT element to that this area will be exposed.

6. Repeated for all 16 LUT elements.

This is the end of the loop for scanning the entire LUT. After all 16 elements are checked, the loop terminates and falls through to the next step. Otherwise, control is looped back up to step 4.

7. Show LUT by storing in hardware LUT.

The LUT that is being worked on during the above procedure is a software table. At this point in the procedure, this software table is transferred to the hardware table which will actually output the information to the output video lines.

8. Point to next exposure table element.

A pointer points to the current exposure table element. This pointer is incremented to point to the next element to be ready for the next pass in this loop.

9. Is new exposure time greater than accumulated exposure time.

This check is done in case the new exposure time is the same (or possibly less than) the accumulated exposure time. If so, no exposure is done for this pass of the loop because this indicates that the accumulated exposure is already at the point where this new exposure point should be and therefore requires no more exposure.

10. Expose current image onto film for the time diferece between new exposure time and accumulated time.

Since the exposure table contains the total accumulated exposure time that the current value should be exposed for, the actual time to expose this area is determined by subtracting the accumulated exposure time from this new exposure time. This difference gives the amount of time needed over what has already been exposed.

11. Increment LUT intensity value counter.

The intensity value counter is incremented. Since the larger number represent darker intensities, the loop continues and checks for lesser intense areas which will be exposed for a shorter time giving a darker end result.

12. Repeated for all 16 levels of intensity.

This loop is repeated for 16 intensity levels.

Heretofore, system employing film recorders included: (1) analog film recorder requiring separate RGB video inputs, (2) computer generating digital commands, (3) Display generator that accepts the high level commands and outputs RGB video.

The display generator is actually a vector-to-raster converter as well as digital-to-analog converter for RGB. This invention combines the analog film recorder functions and the display generator functions into one unit which requires only high level vector commands in digital form to drive it and ideally eliminate the need for the three RGB video interconnections.

This accomplishes several things:

(a) Elimination of the expensive portions of component #3 which usually includes a color RGB monitor which is not essential to the application;

(b) Achieves higher resolution than most preview devices (for example, IBM PC resolution);

(c) Direct and simple input connection and hook-up, use single digital cable (re RS232) as opposed to three or four analog cables.

(d) Digital only device—communication to peripheral of this invention is all digital.

(e) No need for color or graphics on the host. Since the invention (DFR) display processors take high level commands from the host CPU, there is no need for color or graphics capability to exist in the system. It is only necessary for the host to send high-level graphics commands to the graphics controller of the invention and it in turn will drive the color hardcopy device.

(f) Frees up the color display (spooling). Since the graphics generation is taking place in the DFR controller, once the image is down-loaded to the DFR controller, the color CRT is freed up for displaying other images while the hardcopy is being generated. This time can range from a few seconds for slides to 2 or 3 minutes for paper prints. Since the DFR controller is doing the hard work of graphics generation and the host computer is simply sending a list of previously generated commands, this can be handled in many computers by a print spooler or background operation of the computer thus freeing the computer to perform other functions.

(g) Multiple user access. Since in past configurations the hardcopy device is physically attached to the color graphics CRT by means of video cables, the hardcopy device must be fairly close (10–20 feet) to the color CRT. This means that if there are several users on the system, they must wait in line to use the terminal that is attached to the hardcopy device if they want hardcopy. (Note: Although it is possible to run video cables through switching devices and amplifiers to achieve a similar configuration, the extreme expense and logistical problems related to doing so usually make this alternative unacceptable). This would also allow users from remote locations (even in other cities or countries) to tie into the hardcopy devices (through the host or directly) over phone lines or computer networks.

(h) Possible increase in resolution. With the present invention, the resolution of the hardcopy output is not limited to the resolution of the color graphics screen. For color recording devices in installations where the color graphics CRTs used are of too low quality to warrant the purchase of a hardcopy device, a new use if found. With the DFR display processor attached, for example, the IBM 3279 color graphic terminal could be used for CRT preview at 300 by 200 resolution while the output can be a full 512×512 or higher. Even Apple II's with very low resolution screen (160×190) could drive these hardcopy devices for high resolution (512×512) output.

(i) With prior art arrangement the computer does not control film recorder cameras to that exposures must be done manually by user (pressing expose button), whereas in present invention the computer directly controls the camera via digital signal to the camera to expose pictures. This allows for automatic or spooling of pictures very similar in function to multiple user access to a single line-printer peripheral.

BRIEF DESCRIPTION OF THE DRAWINGS

FIG. 3 is a schematic diagram of another form of digital film recorder and peripheral device constructed in accordance with the present invention.

FIGS. 7A–D is a flow sheet for operation of the present invention.

Figure 7B:
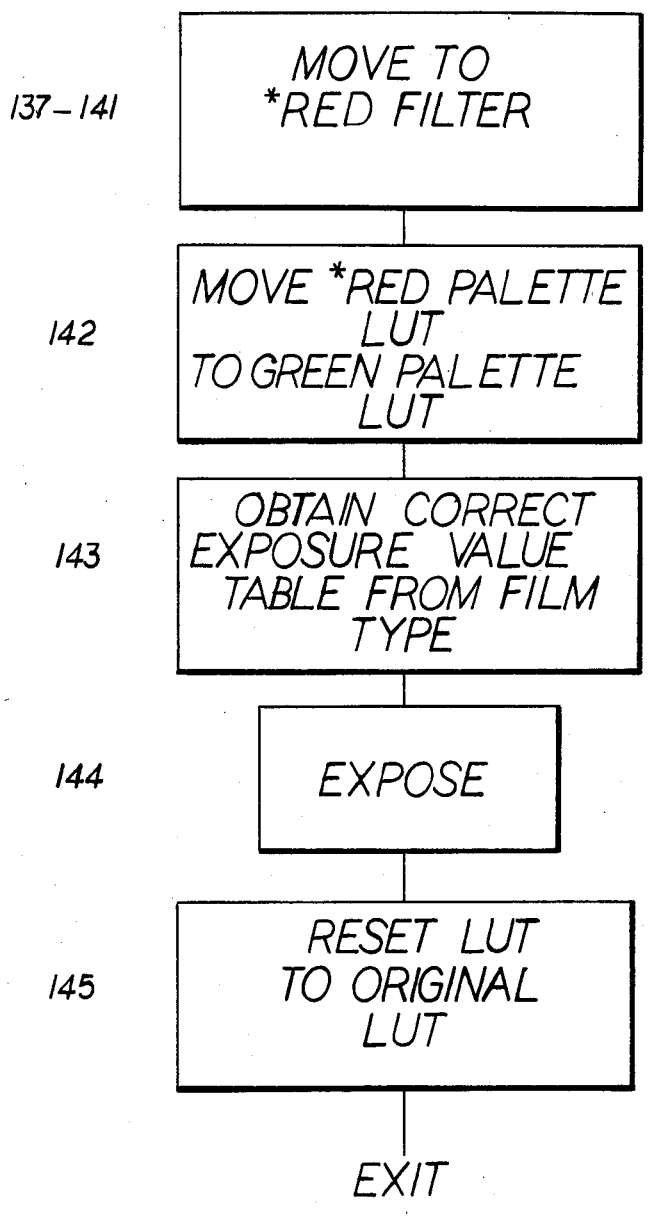
Figure 7D:
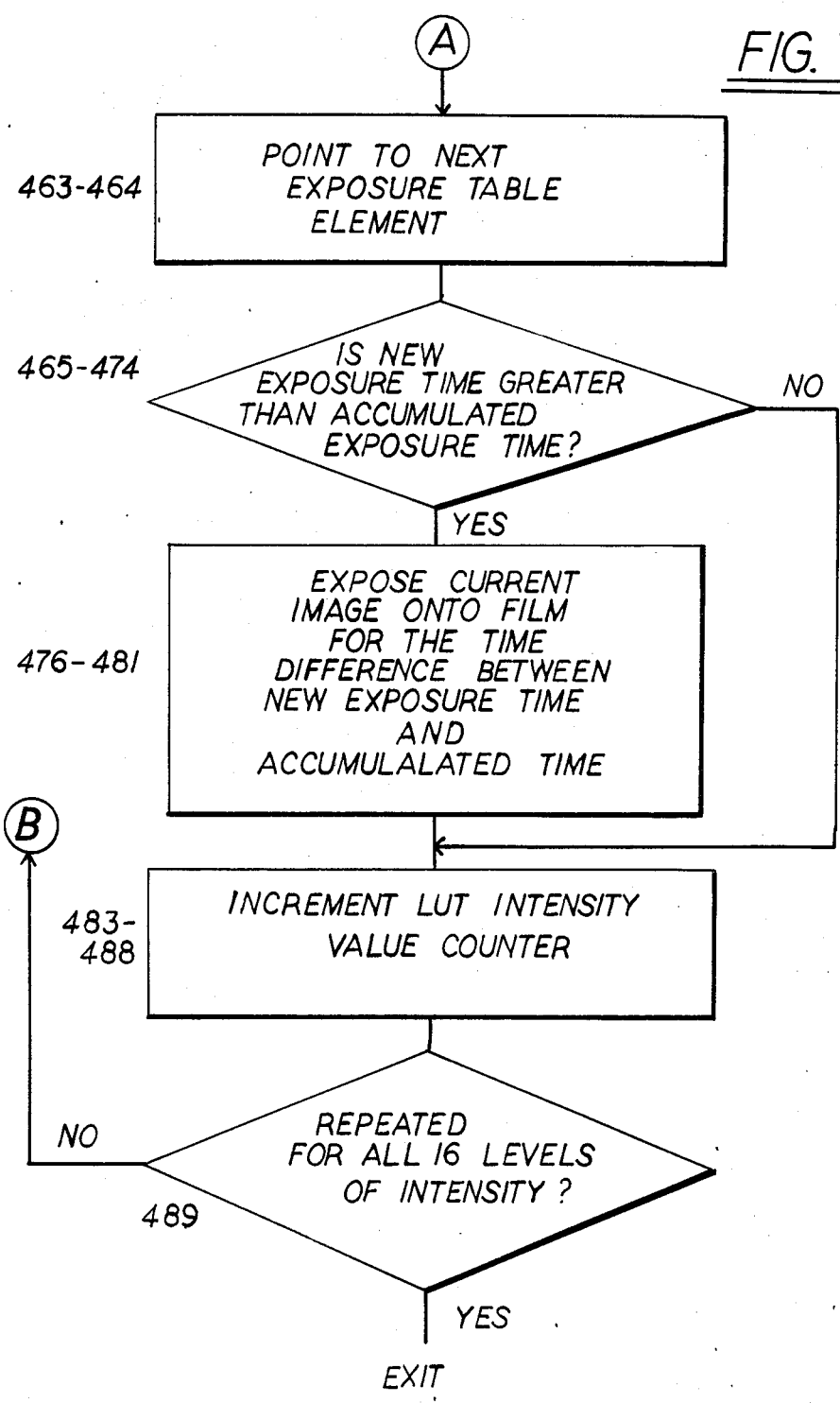

Appendix A is a program listing carrying out the functions set forth in the flow sheets of FIG. 7.

DETAILED DESCRIPTION OF THE PREFERRED EMBODIMENTS

Figure 1:
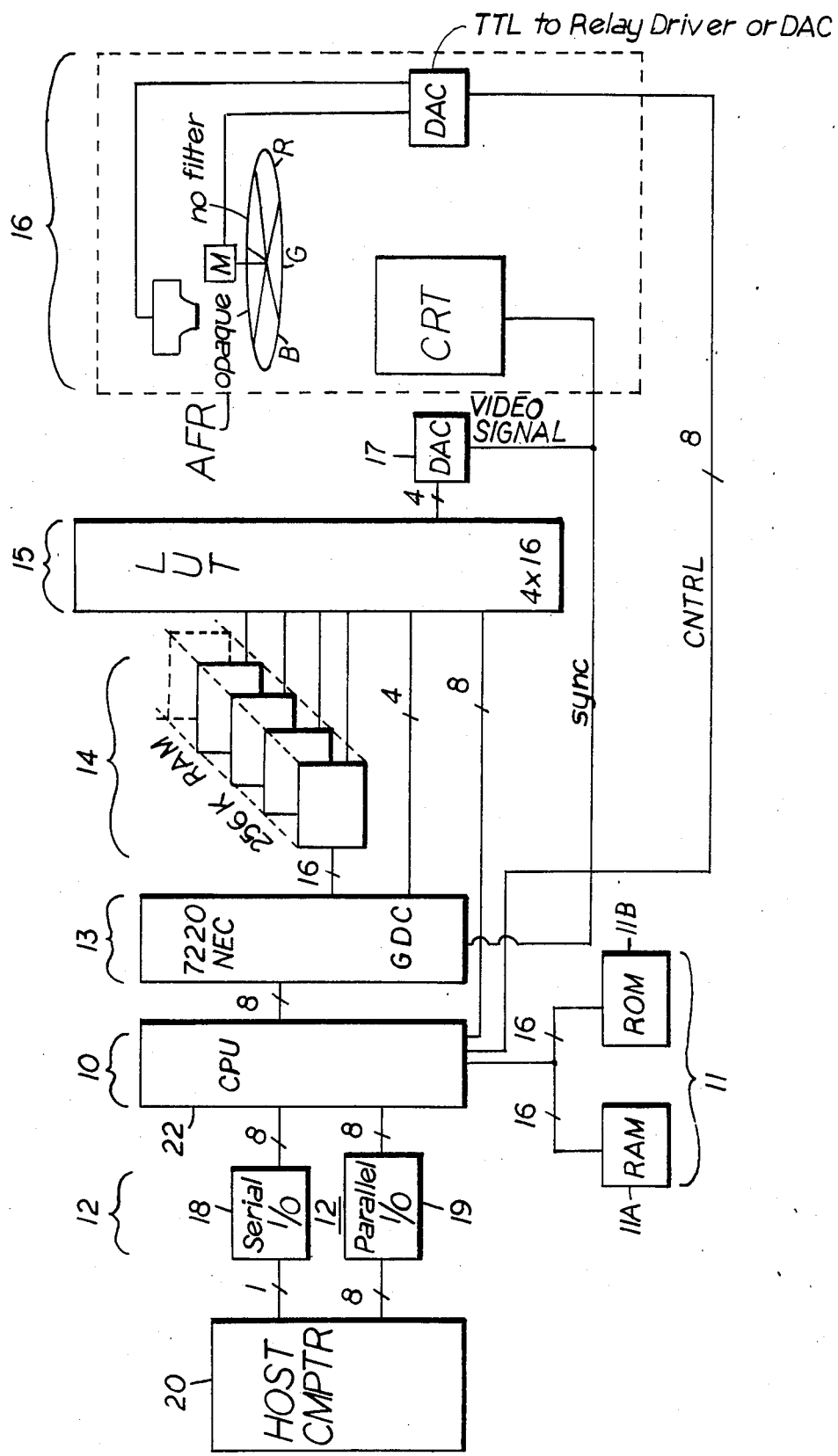
FIG. 1 is a schematic diagram of a digital film recorder arranged for use as a peripheral device and constructed in accordance with the present invention.

Referring now to FIG. 1, there is shown one form of the present invention which has been adapted particularly for use in connection with an analog film recorder such as Palette computer image recorder as produced by Polaroid Corporation. In general, the invention includes a computer 10 having a RAM and ROM 11 and appropriate digital input ports 12. The computer serves as an input to a display controller 13 which drives a display memory stack 14 and a lookup memory 15. The display memory stack is a RAM device for storing pixel information corresponding to incoming high level commands. The lookup memory stores predetermined values of color and intensity for use in developing the final color signal which is delivered to the analog film recorder 16 through DAC means 17.

Conveniently both serial and parallel input ports may be provided for receiving the output of the host computer shown diagrammatically at 20 and which has either type of port. Assuming that the serial port is used, the output is taken to a CPU 22 which is preferably a Z80B device manufactured by Zilog of Cupertino, Calif. The CPU is supported by Z80 compatible RAM which has the capacity of 16K and ROM which has the capacity of 32K.

The RAM memory 11A is used for an input storage buffer, scratch pad, macros and geometrical coordinate data relating to input vector commands. The ROM 11B stores the command interpeter, the palette, the AFR driver program and the font program.

The display driver is preferably a model PD7220/GDC made by NEC Electronics and operates as an intelligent microprocessor peripheral to provide raster scan, computer graphic implementation, and character display. The controller's position is between the video display memory 14 and the microprocessor bus.

Display memory 14 is a 256K RAM memory such as organized into four planes to provide 4 bits of information for use in entering the lookup table 15. The lookup table is a 4 by 16 RAM memory, the output of which drives a DAC 17 with the green sync signal.

Figure 2:
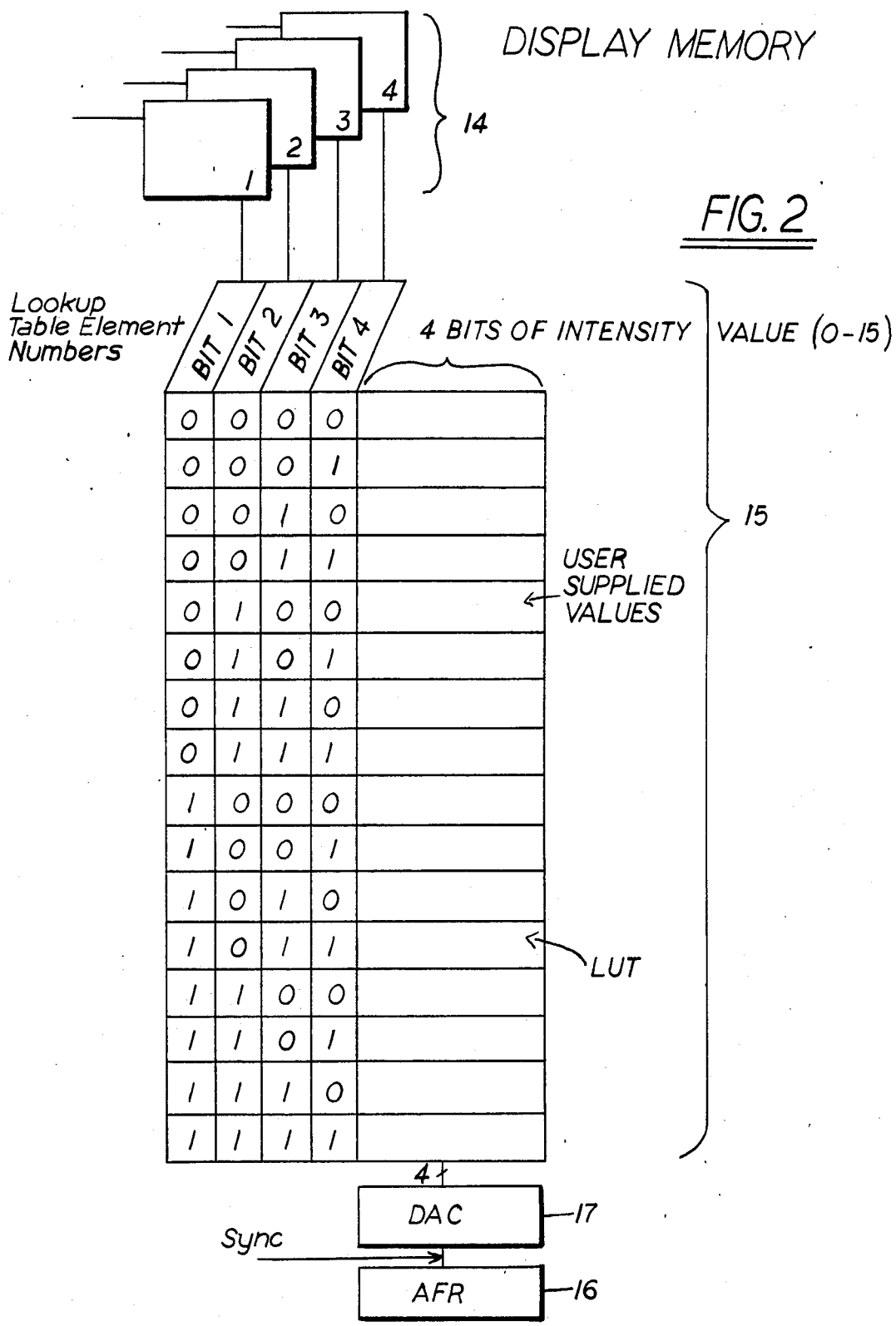
FIG. 2 is an expanded schematic diagram of the display memory and lookup table of the recorder and peripheral of FIG. 1.

FIG. 2 shows the lookup table arrangement in greater detail. The four planes that make up the display memory, the information from that is combined to give you the lookup table element number which in turn gives you the four bits of intensity value for the DAC which is outputted to the AFR.

The output of the lookup table is intensity information only. The color information being carried by an independent control line operating the color wheel and camera in the analog film recorder 16. Of course, the intensity information relates to the specific color being exposed through the wheel so that one may think of the output as containing in sequence the values of red, green and blue which are desired to be exposed. The full description of the operation of the lookup table and display memory 14 are contained in the operations manual for the display controller and will not be given here in detail.

In display memory one has to define the data for each point or pixel (picture element). Color is defined by breaking the display memory up into what is called pixel planes, and each pixel plane is equivalent to the resolution of the screen. The number of planes of information there are per pixel defines how many different colors or how much information can be stored about each one of those pixels. In FIGS. 1–4 there are 4 bit planes or 4 pixel planes, bit 0, bit 1, bit 2, bit 3. So far any given point on the CRT there are 4 planes and 4 binary numbers to define that dot. Four binary numbers generate 16 combinations. In the lookup table, for each pixel on the screen, the processor looks at the value of that pixel by taking the binary equivalent of all 4 of the planes to generate an address. And, the output of this lookup table is mapped into a DAC where a 0 results in a low voltage white, analog voltage out digital time log. If you put in a 15 this results in the maximum voltage out. So a variable video signal output from 0 to 1 volt is generated in 16 steps. So for each value in the lookup table you get a mixture of percentage of red, green or blue up to 16 levels of each color mixed together, so that seqtings in this lookup table are equivalent to 16 different colors. Of course they could be all 16 shades of red or all 16 shades of green, or all 16 shades of blue, or they could be any combinations thereof. Because there are 3×4 or 12 bits, the total possibilities equal 4,096 possible colors. But only 16 selected by the user can be resident at any point in time to produce this red, blue and green signal output.

The graphics display controller (GDC) handles the video timing of how the computer accesses the memory and writes the pixel information into the memory and it also controls the timing by which the data is turned into video, otherwise the timing of the video signal and sync. This chip also at the same time controls the actual writing of vectors or groups of pixels in a line, groups of pixels to form a vector which is aline with a set of poins between two defining two points, a set of points between them. So that the high band language commands from the computer generates the end points and the GDC chip actually does the drawing of the pixels into memory and it does it at a very high speed.

While the control ines are shown as one line, there will be two on the motor for the filter wheel to give it 4 numbers. If the shutter is controlled independently from rewind, and from film advance, there may be 2 or 3 lines going to the camera. The video switch may require 1 to 3 lines there also depending on the functions provided.

Functions provided: At least 3 positions to select red, green and blue lines and maybe another position to select off.

BRIEF EXAMPLE OF OPERATION

The way it works is that a host computer would send a command such as, for example, draw a circle. The command to draw a circle was the letter C. It would send the command through the serial port to the Z80 CPU and says here's a C. The Z80 then has its own software which it is drawing in its system. Then it interprets the C to say that means that the host wants me to draw circle. Following the circle command are the arguments related to what the computer needs to draw that circle. In this case, this firmward needs to have a coordinate of a center, and the amount of radius that you want on the circle that defines the circle. If it was to be a circle centered in the middle of the screen with a radius of 140 pixels, a C would be the Cartesian coordinate of the center of the screen (512×512 resolution).

Then it would send the 140. So the command would look like C256, 256, 140. The Z80 CPU would then compute the information to send to the graphics display controller or put in a high level command. It would put it into the lower level information that the graphics controller needs. And the graphics controller writes the actual information into the display memories. And the color combinations also chosen by the host computer, the one at the circle, for example, all in red. It would write whatever information was needed to define the color.

So the information is now on the screen and being refreshed and being visible. The host computer now says take a picture of that circle by the high level command E. It sends a command, for example, an E for expose through this serial I/O to the Z80 computer. The Z80 sees an expose command (interprets the E as an expose command). It then sends the information to the camera to open the shutter. Next to the first sequenced filter, say red. So the filter wheel turns to the red position. The computer then says there is a black and white monitor here which is off. It then says turn on the red image. So the red elements that are coming out of the lookup table which happens to be the whole circle definition is now viewable on this black and white monitor being exposed through the red filter to the camera lens to the film.

The computer can also command an output for a particular film. i.e., Ektochrome film. So the Z80 knows how long to expose the red image for the particular ASA and emulsion value of the film. So it says, let's say the red gets exposed for 5 seconds. It then turns the red off and moves the filter wheel to green, switches the green image on the screen and exposes that for, say, 10 seconds. Then turns the green off, moves the filter wheel to blue and puts the blue information up on the black and white screen and exposes the blue part for, say, 10 seconds. And so after 10, 20, 25 seconds, you've now made a full color overexposure on the film. The Z80 would then say close the shutter on the film and wind the film if you have an autowind camera, for example, and then it becomes ready for the next command.

The problem is known prior devices is that the host computer has to be able to talk to one device for drawing its picture and then to another device which exposes the picture. And the camera is a slave to this picture drawing device. Now, with this version, the picture is actually being generated within the camera's box itself. So to the computer it only knows about talking to one device which is integrated, which both can draw into memorn and expose film, change lookup table values for different types, and wind the film, all under one control.

The problems that this solve are a number of them.

It eliminates the necessity for 2 sets of CPU memory and software and control lines.

It allows multiple host computers to make images by allowing the digital information to be hooked up by allowing digital input as opposed to allowing analog. In the past, because these are analog video signals, you are limited on the length of them, where how physically long they can be and it is very expensive to cable RGB video cables around the building, for example. Whereas digital cables can go over modems or phone lines or certainly lot longer distances than analog. And you can send the digital information remotely to the camera device now because you are actually sending the information to recreate the image as opposed to sending the output image around. So multiple types of devices can now hook up to the camera system where before these video signals are all different compared to all the different devices on the market, color graphic CRTs because they all put out different video signals. They are all different. The timing is different, the video threshold are different. The circuitry are all slightly different. So the camera has to be adjusted to such different video signals. Whereas, now the RS232 interface is a standard. And so whether it's an Apple, or an IBM-PC or a Timex-Sinclair or an IBM mainframe 360, they can all talk digitally to this invention without having to develop any special output tuned for each video terminal.

The present invention allows use of high resolution devices, for example, one could be previewing a very low resolution device. On an Apple computer one can look at a pie chart which is 160×190 resolution, preview to that in that 160×190 resolution, but then send the actual higher resolution information which was generating that pie chart on the Apple, and get a higher resolution output than one would have than by just photographing my Apple's screen. So this invention can upgrade the resolution of the particular host device used.

In order to have a color graphics terminal or very high resolution, 1000 by 1000 dots, each one of the display memory plans has to be 1000 by 1000 pixels. That is a lot of memory. One also has to have very fast memory in order to get all those dots out in 1/30th of a second so that the image doesn't flicker, but the image is the memory in the camera system. The camera film does not flicker. So in fact the film is like random access memory. Once the image is put on the screen, the dot is exposed and memorized on the film. So if the end result is to make a slide, there is no need for this video to be very fast because at the end of the day, the film exposure of the film will be what remembers the picture.

Consequently in the present invention slower than normal video circuitry can make it less expensive than would be necessary to get high resolution. And, on the video side, a much less expensive black and white CRT that may flicker can get the same results on the film, so much less expensive circuitry has created the same or higher resolution output.

Referring now to FIG. 3. The organization of the implementation of the invention in FIG. 3 is dictated by the nature of the analog film recorder. The recorder is of the type which is constructed and arranged to receive simultaneously and separately the red, green and blue signals at one input together with a video switch control input for selecting which of the colors is to be used by the CRT at a given time. Such an arrangement is employed by the manufacturers of analog film recorders so that if the graphics display generator is driving a color CRT monitor, the monitor can be replaced with the analog film recorder of the type shown in FIG. 3 without reconfiguration of the interconnections. The lookup table of FIG. 3 is given in FIG. 4 which shows that it contains memory space for simultaneous storage of red, green and blue data, each of which has an independent output through a separate DAC which is then combined through the video switch.

The operation of a lookup table in this manner is described in the previously referenced NEC manual relating to the GDC controller chip.

Figure 5:
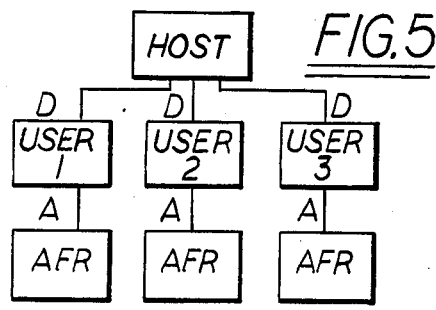
FIG. 5 is a diagrammatic sketch showing typical prior art interconnection system for connecting film recorders into a computer system.

Referring now to FIG. 5, the manner in which prior graphics systems were interconnected to a host is shown diagrammatically thus a plurality of analog film recorders were connected to each user station by an analog data line carrying video signals. Each user station, in turn, is connected to the host. In such a system the multiple use of a single film recorder by all users is precluded and the numerous disadvantages mentioned herein regarding transmission of information to the film recorder incurred, such as the inability to use telecommunications lines or other restrictions typically following from the requirement that video signals be transmitted.

While the user is exposing the image with the analog film recorder, the user is not allowed or cannot do other processing so that the efficiency of the user station is reduced.

Figure 6:
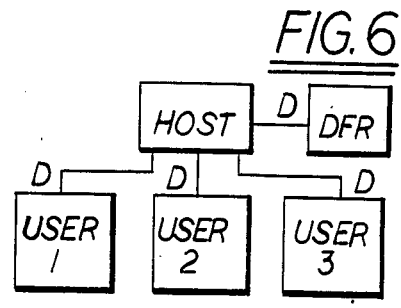
FIG. 6 is a diagrammatic sketch showing the simplified interconnection pattern for the digital film recorder and peripheral on the present invention.
Figure 4:
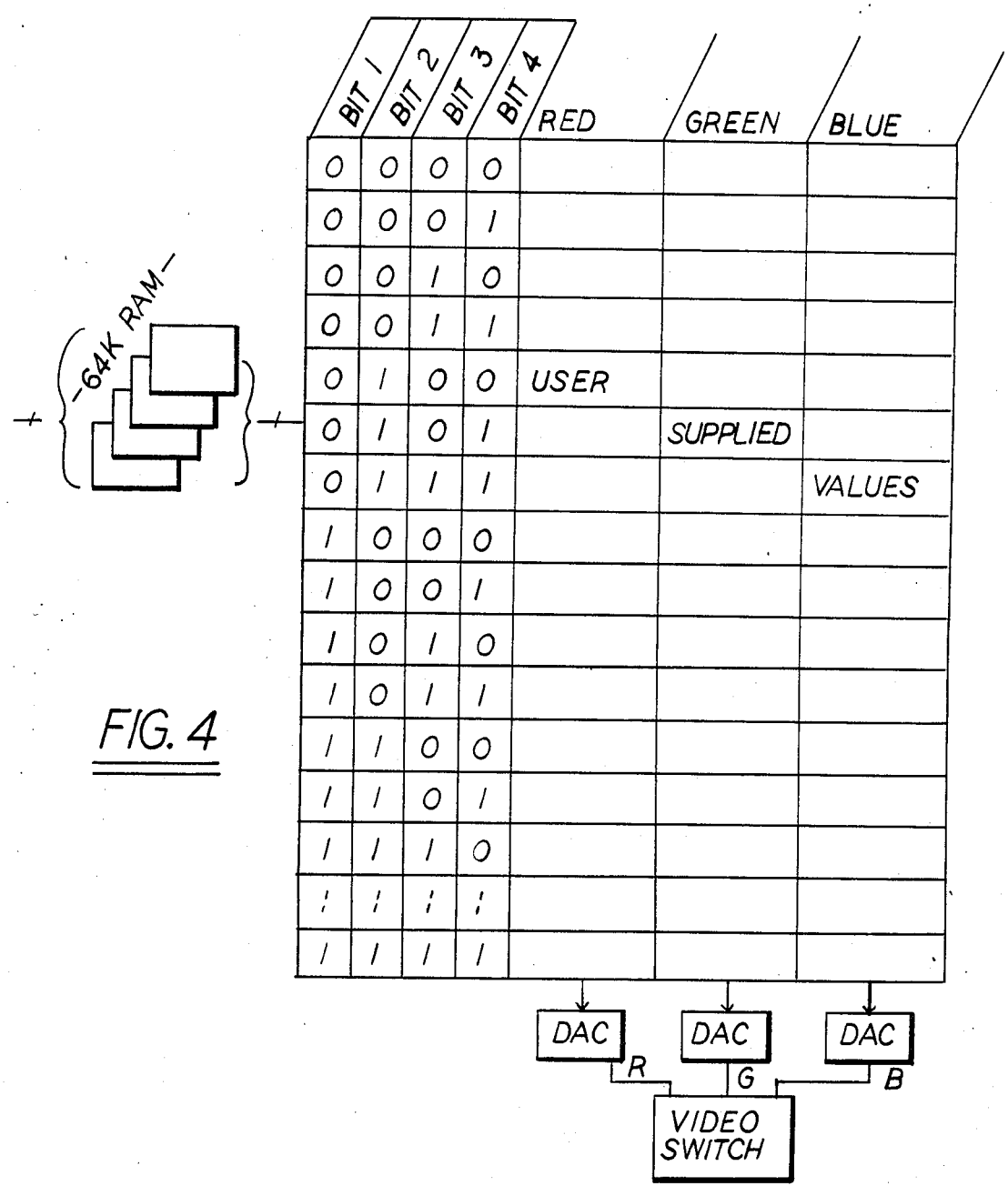
FIG. 4 is an expanded diagrammatic view illustrating the lookup table arrangement of the recorder and peripheral of FIG. 3.

On the other hand, by use of the present invention, as shown in FIG. 6, the digital film recorder is connected to the host through a digital connection instead of through analog connecton to each user, thereby reducing allowing the number of film recorders to be reduced to a single digital film recorder. In practice each user can command the host to operate the digital film recording for production of color hardcopy in a system operating with spooling so that the host computer time devoted to the task is minimized, and the host computer can continue with other functions.

| SPECIFICATIONS | |
| --- | --- |
| Processors | Z-80B (6 MHz) Central Processing Unit |
| | NEC 7220 (3 MHz) Graphics Display Controller |
| | Quintar 1000: 3.0 MHz |
| | Quintar 1080: 4.5 MHz |
| Memory: | 256K bytes of RAM for display |
| | Up to 16K bytes of RAM for program |
| | Up to 32K bytes of EPROM |
| Input: | RS-232C serial interface at 16 baud rates from 110 to 19.2 with 0, 1, or 2 stop bits and even, odd, or noparity; DB-25F connector |
| | Centronics-compatible, 8-bit parallel interface; DB-25M connector |
| | Power: 115 VAC ±10% |
| Output | 1000 : ±3% true RS-170 video at 512 × 512 |
| | 1080 : RGB video at 832 × 630 |
| | One each BNC-type connector for red, green, blue, and composite sync (composite sync also contained in green video signal) |
| | Power: ±5 volts, 3-amp DC; ±12 volts, .5-amp DC |
| Communications: | X-ON, X-OFF - RTS, CTR, DTR, DSR |
| | 1K RAM communications buffer |

SPECIFICATIONS

| | |
|---|---|
| Temperature: | 10–40 degrees Centigrade |
| Humidity: | 0–95% non-condensing |
| Physical: | Dimensions: 11″ × 15″ |
| | Weight: 8 pounds |
| Vertical Scan Rate: | 1000 : 60 Hz |
| | 1080 : 50 Hz |
| Horizontal Scan Rate: | 1000 : 16 KHz |
| | 1080 : 18 KHz |
| Drawing Speed: | 1000 : 1200 nanoseconds per pixel |
| | 1080 : 888 nanoseconds per pixel |

There now follows a list of hardware specifications, a graphic commands summary, and a program listing for carrying out the flow chart of FIGS. 7.

| Hardware Specifications | |
|---|---|
| Processors | Z-80B (6 MHz) central processing unit |
| | NEC 7220 Graphics Display Controller |
| | Q1000 = 3 MHz |
| | Q1080 = 4.5 MHz |
| Memory | 256k bytes of RAM for display |
| | Up to 16k bytes of RAM for program |
| | Up to 32k bytes of EPROM |
| Input | RS-232C serial interface at 8 baud rates (110,300,600,1200,2400,4800,9600,19200) with 0, 1, or 2 stop bits and even, odd, or no parity. |
| | Requires DB-25F connector. |
| | Power: Requires 115 VAC+10% |
| Output | Q1000: +3% true RS-170 video |
| | Q1080: RGB video (using long persistence phosphor) |
| | One each BNC-type connector for red, green, blue, and composite sync (composite sync also contained in green video signal) |
| | Power: +5 volts, 3-amp DC; |
| | +12 volts, 5-amp DC |
| Communications | Software: X-ON, X-OFF |
| | OR |
| | Hardware: RTS (Request-to-send), CTS (Clear-to-send) |
| Temperature | 10–40 derees Centigrade (degrees Farenheit) |
| Humidity | 0–95% non-condensing |
| Physical size | Dimensions: 2″h × 17″w × 11″d |
| | Weight: 8 pounds |
| Drawing speed | Q1000: 1200 nanoseconds per pixel |
| | Q1080: 888 nanoseconds per pixel |
| Vertical Scan Rate | Q1000: 60 Hz |
| | Q1080: 50 Hz |
| Horiz. Scan Rate | Q1000: 16 KHz |
| | Q1080: 18 KHz |
| Scan Frequency | Q1000: 30 Hz interlaced |
| | Q1080: 25 Hz interlaced |
| Resolution | Q1000: 512 × 512 pixels |
| | Q1080: 832 × 630 pixels |

Introduction to Graphics Commands

If you are a seasoned professional in the computer graphics field then there is no need for you to read this section. However if you are just beginning or if you want a quick refresher on some of the simpler techniques please continue.

This section is not intended as a complete course in computer graphics. It is instead designed to give you a quick and simple overview of some of the concepts, ideas, and shortcuts especially as they apply to the Quintar.

One of the main units of measurement in the graphics field today is speed; how fast does a circle fill, how fast does a line draw, how fast can a complex polygon be filled, etc. Because of the big concern with speed you will find as you use the Quintar more and more that there are many commands which seem redundent. You will also notice that there is usually at least 2 or 3 and sometimes even 4 and 5 ways to draw a particular image. Why is there all of this duplication of effort?

The answer again is speed. Even though there may be 3 ways to draw a filled square, one of those ways is going to be faster than the other. Another thing to keep in mind is also the ease of use.

If one way to draw the square is faster but it is more difficult to use or it doesn't work as well with your software for instance then you aren't stuck using it. You can simply choose another way to draw that same image.

Going back to the question of speed, let us take a look at some actual examples of faster ways to draw the same type of images.

(1) When filling an area, it is faster to set area fill ON, draw the image, then let it be filled than to first draw the image and then go back and give the command to fill it.

(2) After sending any command to the Quintar there is no need to send a carriage return or a line feed.

Documentation Abbreviations

The following abbreviations and formats are used within this documentation:

(1) You will first notice that each "command" section is preceded by a "summary" section. This summary section is designed to be used two ways. For the first time reader it is recommended that the summary sections be skimed before the details in the following section are studied. This way the reader has an idea of what is available. Secondly for the user who is already familiar with the use of the Quintar this summary section can be used as a refresher to remind him or her of the syntax, name, etc. of each command.

(2) For each detailed explanation of a command you will always find the following information in the following order:

(a) You will first see a line containing the syntax of the command.

(b) Next will be a one or two line summary of the function of the command.

(c) After the summary you will find the detailed explanation. This may include possible uses for the command also.

(d) You will then see the default setting for that command if it is appropriate. For example the overstrike mode defaults to OFF while soft boot mode has no default.

(e) Finally you will find one or more examples of how to send the command to the Quintar using Microsoft BASIC. These examples will all work with any version of Microsoft BASIC including both BASIC or BASICA in the IBM Personal Computer.

(3) For all commands with an argument (c) the argument must be replaced with a valid character as explained for that command. The character can be in either upper or lower case. For example MODE # has an argument (c). This (c) can be replaced with the letters B, U, F, or W. If you use the letter Y it will be illegal since it isn't one of the choices, however if you want to use letter B it can be either "B" or "b" and they will have the same meaning.

(4) For all commands with an argument (n) the argument can be any one of the following forms of an integer:
  (a) A 1 digit integer followed by a comma. For example "1," or "9,"
  (b) A 2 digit integer followed by a comma. For example "12," or "89,"
  (c) A 3 digit integer. For example "123" or "012"
If you need to enter a negative integer and it is legal to do so simply precede any of the above type of numbers with the minus sign.
Examples are "−3," or "−82," or "−036"

(5) For commands with (h) arguments you can replace each of the h's in the argument with any hexidecimal digit (0 to F). For example an argument (h) can be replaced with a "3" but an (hhh) argument MUST be replaced with 3 hex digits such as "OF6". There is no need to follow the argument with the letter "h" since the Quintar will be expecting a hex digit and nothing else.

(6) For commands that require coordinate arguments like (x,y) or (x1,y1) (x2,y2) the type of coordinate that is used depends on the coordinate mode that is set. There are 2 coordinate modes; decimal and binary. For an explanation of decimal coordinates and how to enter them please see "MODE E". For an explanation of binary coordinates and how to enter them please see MODE B.
Any coordinate entered can also be a dot (.) meaning use the current cursor position as the coordinate.

(?) What does translation and mask do with a dot?

(7) Any argument that appears in brackets { } is an optional argument. This means that it may or may not be needed depending on which option the the command you are using you take. For example if we take a look at the MODE, command it is defined as:

MODE, (c1) {(c2)}

This means that if we use this command we will always have to use the MODE, and the first argument (c1). Then depending on which choice we pick for (c1) we may also have to use argument (c2).
For example we if want to display page 1 the command is:

MODE, 1

However if we want to use color lookup.table 2 then the command will be:

MODE, L 2

"Drawing" Commands

Summary of Drawing Commands

The following is a quick summary of drawing commands supported by the Quintar board. For a more detailed explanation see the following section entitled "Drawing Commands". It is suggested that the first time reader quickly skim this section to find out what is available and then thoroughly read the next section for a complete understanding. It is also recommended that the reader have the Quintar setup and running while reading so he or she can test each command as it is explained. As they say, "A picture is worth a thousand words".

APPENDIX A

Quintar 1000, 1080, 2000, PVB

Software Command Set

The set of graphics primitive resident in the Quintar 1000, 1080, 2000 and PVB requires a minimum amount of information from applications software in order to create images. Standard ASCII commands are used to set alphanumeric mode, plot mode, or one of several plot submodes. The following plot submodes are supported:

Dot—specifies a single pixel at any x,y coordinate.

Incremental dot—an extension of dot mode, requiring as little as one-sixth the data for images composed of complex x,y coordinate patterns.

X-bar—specifies horizontal lines with one x,y coordinate and only the x value of the second x,y location.

Incremental x-bar—specifies stacked horizontal lines, requiring an initial y-bar as the base line and automatically incrementing one pixel in the x direction with each subsequent x value.

Y-bar—specifies vertical lines with one x,y coordinate and only the y value of the second x,y location.

Incremental y-bar—specifies stacked vertical lines, requiring an intial y-bar as the base line and automatically incrementing one pixel in the x direction with each subsequent y value.

Vector—specifies a line one pixel wide with any two x,y coordinates.

Concatenated vector—an extension of vector mode, requiring only the subsequent x,y coordinate of a connected line after the first two x,y coordinates have been specified.

Circle—specifies a circle one pixel thick with an x,y coordinate for the center an a radius in pixels.

Filled circle—specifies a solid circle using the above arguments.

Rectangle—specifies a rectangle with two x,y coordinates representing either pair of opposite corners.

Filled rectangle—specifies a solid rectangle using the above rectangle arguments.

Arc—specifies any portion of a circle with an x,y coordinate for the center, a radius in pixels, a start degree, and an increment degree.

Filled arc—specifies a solid wedge or slice of a filled circle using the above arc arguments.

Polygon—specifies a set of concatenated vectors defined by any number of x,y coordinates, the first and last of which are automatically connected to form a closed figure.

Filled polygon—specifies a solid convex figure specified by any number of x,y coordinates or a solid concave figure specified by up to 128 x,y coordinates (provides for negative overlap or fill).

Area fill—permits changing the color of a bounded area to a different color by positioning the cursor inside the area.

Clipping is provided for all circles and arcs.

The command set of the Quintar 1000, 1080, 2000 and PVB consists of standardd ASCII characters with user-selectable decimal or binary coordinates. In alphanumeric mode, a full 96-character set is provided in hardware, and users may define special characters. A complete listing of the mode code and control code sequences follows the specifications.

| Name | Definition |
|---|---|
| X-bar | ! (x1,y1) (x2) |
| Y-bar | " (x1,y1) (y2) |
| Incremental X-bar | # (x1,y1) (x2) (x3) . . . (xn) |
| Incremental Y-bar | $ (x1,y1) (y2) (y3) . . . (xn) |
| Dot | % (x1,y1) |
| Incremental dot | & (x1,y1) (c1) (c2) . . . (cn) |
| Vector | ' (x1,y1) (x2,y2) |
| Concatenated vector | ( (x1,y1) (x2,y2) (x3,y3) . . . (xn,yn) |
| Arc | ) (x,y) (r) (s) (d) |
| Circle | * (x,y) (r) |
| Rectangle | + (x1,y1) (x2,y2) |
| Polygon | / (x1,y1) (x2,y2) (x3,y3) . . . (xn,yn) |

Drawing Commands

The following pages contain a complete explanation of all "drawing" commands.

! (x1,y1) (x$^2$)
X-Bar
Draw straight horizontal line.

The X and Y bar commands are 2 of the simplest. Their purpose is simply to draw straight horizontal or vertical lines. The X-bar command draws lines parallel to the X-axis (the bottom of the screen). The first parameter (x1,y1) is the screen coordinate at which to start drawing the line. The second parameter (x2) specifies the point on the X-axis that the line should be drawn to.

To draw a straight vertical line see command " " "

BASIC example:

```
10 Rem - Print a horizontal line starting at (12,34)
11 Rem and extending to (52,34) which is a length
12 Rem of 40 pixels. Note that 52 is simply the
13 Rem starting x (12) added to the ending x (40)
20 LPrint "!" + "12,34," + "40,";
10 Rem - The above line can also be drawn with the
15 Rem following command
20 LPrint "!" + "012034" + "040";
```

" (x1,y1) (y2)
Y-bar
Draw straight vertical line.

This command allows you to draw a line parallel with the Y-axis (the left side of the screen). The first parameter (x1,y1) gives the starting point of the line and the second parameter (y2) specifies the location on the Y-axis that the line should be drawn to.

To draw a horizontal line see command "!"
BASIC example:

```
10 Rem - Draw a vertical line starting at (56,78) and
15 Rem extending 30 pixels to (56,108)
20 LPrint Chr$(34) + "56,78," + "30,";
```

(x1,y1) (x2) (x3) . . . (xn)
Incremental X-bar

Draw incremental straight horizontal bars all starting in column x1 and continuing to columns x2, x3, . . . , xn.

The first three parameters of this command work identically to the the three parameters of the X-bar command defined above. This meaning that they will draw a line starting at location (x1,y1) and extending to a point (x2, y1). The difference is that after this initial line is draw, additional lines can be drawn by specifying only one number. This number being the location on the X-axis for the line to stop after incrementing the value of y1 by one pixel.

In other words, after the first line is drawn, 1 is added to the y1 coordinate. The next argument given (x3) then specifies the next line to be drawn. This next line will start at the new (x,y) coordinate and be drawn horizontally to the (x3) point of the X-axis.

In this manner you can continue to draw horizontal lines by specifying new X-axis points and having the Quintar board automatically increment the Y-axis starting point after each line is drawn.

To draw incremental vertical straight bars see command "$"
To draw horizontal lines see X-bar command "!"
To draw vertical lines see Y-bar command " " "
BASIC example:

```
10 Rem --  Draw 3 lines starting at coordinate (5,2).
11 Rem     The first line will be 10 pixels long (from
12 Rem     (5,2) to (14,2)), the second will be 9 (from
13 Rem     (5,3) to (12,3)), and the third will be 6 (from
14 Rem     (5,4) to (10,4))
15 Rem
20 LPrint  "#" + "5,2," + "15," + "13," + "11,";
```

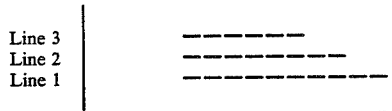

The above example is exactly the same as the following:

```
10 Rem - Draw 3 parallel lines
20 LPrint "!" + "5,2," + "14,";
30 LPrint "!" + "5,3," + "12,";
40 LPrint "!" + "5,4," + "10,";
```

$ (x1,y1) (y2) (y3) . . . (yn)
Incremental Y-bar

Draw incremental straight vertical bars all starting in column y1 and continuing to columns y2, y3, . . . yn.

This command works like the Incremental X-bar command above with the exception that it draws lines along the Y-axis instead of the X-axis.

The first three parameters of this command work identically to the the three parameters of the Y-bar command defined above. This meaning that they will draw a line starting at location (x1,y1) and extending to a point (x1,y2). The difference is that after this initial line is draw, additional lines can be drawn by specifying only one number. This number being the location on the Y-axis for the line to stop after incrementing the value of x1 by one pixel.

To draw incremental horizontal straight bars see command "#"
To draw horizontal lines see X-bar command "!"
To draw vertical lines see Y-bar command """
BASIC example:

```
10 Rem --   Draw 3 lines starting at coordinate (5,2).
11 Rem      The first line will be 6 pixels long (from
12 Rem      (5,2) to (5,7)), the second will be 4 (from
13 Rem      (6,2) to (6,5)), and the third will be 2 (from
14 Rem      (7,2) to (7,3))
15 Rem
20 LPrint   "#" + "5,2," + "7," + "5," + "33";
```

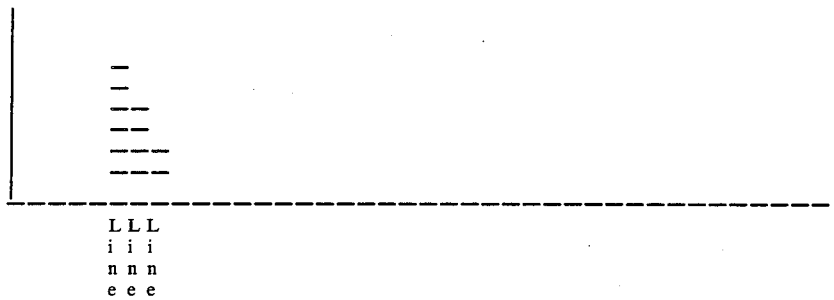

The above example is exactly the same as the following:

```
10 Rem - Draw 3 parallel lines
20 LPrint Chr$(34) + "5,2," + "7,";
30 LPrint Chr$(34) + "6,2," + "5,";
20 LPrint Chr$(34) + "7,2," + "3,";
```

% (x1,y1)
Dot
Place a single pixel any place on the screen.
This command allow the user to place a pixel at any location of the screen. By doing so the user can do anti-aliasing by hand, can create very small pictograms or icons, etc.
BASIC example:

```
10 Rem - Place a single pixel at coordinate (100,37)
20 LPrint "%" + "100037";
```

& (x,y) (c1) (c2) . . . (cn) (This is terminated by anything other than a valid code)
Incremental dot
Place a single pixel in a position relative to any coordinate position.
This command allows you to place single pixels on the screen at positions relative to a certain coordinate (x,y). In order to position the pixel the following chart and it's associated characters must be used.

When using this chart, the cursor position (x,y) is always assumed to be under the "@" position. Therefore by using this command with coordinates (10,20) and then an "A" argument you will get a single pixel at location (10,21). An "@" argument will give you a pixel directly under the coordinate.

After giving the character argument, the coordinate position is assumed to now be under the new pixel. In other words if we used an argument "B" the pixel at relative location "B" would become active and then you could reposition the above diagram with the "169" over the pixel that we just made active. This means that the above realtive diagram is dynamic not static; every time we activate a new pixel the chart will move.

New pixels will continue to be activated until a character that isn't on the chart is entered.

For displaying dots in the standard coordinate format see the dot command "%".

BASIC example:

```
10 Rem - Draw a zigzag line at the current cursor
11 Rem with each zig and zag one pixel long.
20 LPrint "&" + "."; "MmMmMmMmMmMmMm";
10 Rem - Draw the same type of zig-zag line except
11 Rem have the zigs and zags 2 pixels long
20 LPrint "&" + "."; "RrRrRrRrRrRr";
```

' (x1,y1) (x2,y2)
Vector
Draw a vector (line) from coordinate (x1,y1) to (x2,y2)

This command is actually self-explanatory. By entering any two screen coordinates (x1,y1) and (x2,y2), the Quintar will automatically connect the two points with a solid line.

BASIC example:

```
10 Rem - Draw a vector (line) from (10,20) to (30,40)
20 LPrint "''" + "10,20," + "030040";
```

( (x1,y1) (x2,y2) (x3,y3) . . . (xn,yn)
Concatenated vector

Draw connected lines by entering the coordinates to connect and the order in which to connect them.

This allows the user to easily draw connected lines. The first argument (x1,y1) specifies the coordinate at which to start drawing the first vector. Thereafter all that is needed as far as input is the ending coordinate of the line. After each line is drawn the ending coordinate becomes the new starting coordinate for the next line.

In order to draw polygons see the polygon command "/".

To quickly draw rectangles see the rectangle command "+"

To drawing lines that aren't connected see the vector command """"

BASIC example:

```
10 Rem - Draw a concatenated vector from (10,20) to
11 Rem (30,40) to (100,150) to (200,299)
20 LPrint "(" + "10,20," + "30,40,";
30 LPrint "100150" + "200299";
```

| ) (x,y) (r) (s) (d) | (r) = radius = 1 to 999 |
| | (s) = start = 0 to 360 |
| | (d) = delta = 0 to 360 |

Arc

Allows drawing of an arc with center point (x,y), radius of (r), starting point on the circle of (s), and the length of the curve being (d) degrees.

By using this command, the user can display any portion of a complete circle. The center of that circle or arc being the coordinate argument (x,y) and the radius of the circle or arc being the argument (r) or radius.

The argument (s) start specifies the point on the circle in degrees for the arc to start. This assumes the standard points of 0 degrees being at the 3 o'clock position, 90 degrees at the 12 o'clock position, etc.

The last argument (d) delta is the number of degrees in a counter clock-wise rotation for the arc to be drawn from the starting position. For example if the starting position were 10 degrees and the delta was 85 degrees the the arc would appear from 10 degrees to 95 degrees (95=10 (starting)+85 (delta)).

For full circles see the circle command "*"

No eliptical arcs are allowed althought these can be drawn under the control of the host computer using either the dot or incremental dot commands.

BASIC example:

```
10 Rem - Draw an arc with center at (40,50),
11 Rem radius of 60 pixels, starting at 20 degrees
12 Rem and ending at 95 degrees
```

```
20 LPrint ")" + "40,50," + "60," + "20," + "95,";
```

| * (x,y) (r) | (r) = radius = 1 to 999 |

Circle

Draw a circle with center point at (x,y) and a radius of (r)

The circle command is very simple. The first argument (x,y) specifies the center of the circle to be drawn while the final argument (r) radius specifies the radius of the circle. The radius is measured from the center (x,y) of the circle to a vertical point exactly (r) pixels directly above the center.

To draw partial circles (arcs) see the arc command ")"

BASIC example:

```
10 Rem - Draw a circle with radius of 100 pixels
11 Rem starting at coordinates (150,200)
20 LPrint "*" + "150200" + "100";
```

+ (x1,y1) (x2,y2)
Rectangle

Allows the drawing of a rectangle any size by specifying any 2 opposite sides of the rectangle (x1,y1) and (x2,y2).

This command, like the circle command above, is very simple to use. To draw any size rectangle in any two dimensional rotational perspective only two arguments are needed.

Both arguments (x1,y1) and (x2,y2) are coordinates. These specify any two opposite corners of the rectangle. For example a rectangle that had the following corners:

```
10,20                    30,20
  +--------------------+
  |                    |
  |                    |
  +--------------------+
10,10                    30,10
``` could be drawn by either specifying the coordinates (10,10) and (30,20) or the coordinates (10,20) and (30,10). These pairs of coordinates could also have been specified in either order. The rectangle (10,20), (30,10) is the same as the rectangle (30,10), (10,20).

Rectangles can also be drawn with the vector command """".

Note that these rectangles will always have sides that are parallel to the sides of the screen. To draw a rectangle in any other perspective use the polygon command "/".

BASIC example:

```
10 Rem - Draw a rectangle with heighth of 20 pixels
11 Rem and length of 50 pixels starting with the
12 Rem bottom, left corner at coordinate (20,40)
20 LPrint "+" + "20,40," + "70,60,";
```

/ (x1,y1) (x2,y2) (x3,y3) . . . (xn,yn);
Polygon

The polygon command will allow the user to draw points with the final point (xn,yn) automatically being connected back to the starting point (x1,y1).

This command is very similar to the concatenated vector command explained above. That is a vector is automatically drawn from the first coordinate (x1,y1) to the second coordinate (x2,y2), and then automatically from the second coordinate (x2,y2) to the third (x3,y3) and so on until the final coordinate (xn,yn) is entered.

The difference occurs at this time. After the final coordinate has been entered the final argument to this command is a semi-colon (;). This causes the Quintar board to automatically connect this last coordinate (xn,yn) to the first coordinate (x1,y1) without the user having to re-enter the first coordinate. This allows for very easy and flexible drawing of polygons.

BASIC example:

---
10 Rem - Draw a triangle with corners at (10,20),
11 Rem (30,80) and (40,90)
20 LPrint "/" + "10,20," + "30,80," + "40,90," + ";";
---

End of Drawing doc

"CONTROL" COMMANDS

The following CONTROL commands represent mainly commands to move the cursor's either by character cells or by pixels. In addition to the "move" commands there are also a couple miscellaneous commands to sound the bell, clear the screen, abort, end macro, and turn plot mode off.

All of these commands are executed by first pressing down the control (CTRL) key and while holding it down pressing another key. For example CTRL-G means hold down the control (CTRL) key and press the letter G at the same time. The letters can be in either upper or lower case.

None of these commands have extra arguments to them.

Summary of CONTROL Commands

The following is a complete summary of all commands. It is suggested that you skim this section before proceeding to learn each command in detail. The detailed descriptions of each CONTROL command follow this summary.

| Command | Hex Number | Description |
|---------|-----------|-------------|
| CTRL-C | (03n) | Abort current command. |
| CTRL-D | (04h) | Cursor up one pixel. |
| CTRL-G | (07h) | Sound bell. |
| CTRL-H | (08h) | Backspace one character. |
| CTRL-J | (0Ah) | Linefeed (down one character). |
| CTRL-K | (0Bh) | Vertical tab (up one character). |
| CTRL-L | (0Ch) | Clear CRT screen. |
| CTRL-M | (0Dh) | Carriage return. |
| CTRL-P | (10h) | Tells Quintar that next number is a register number to read a single x or y coordinate from. |
| CTHL-U | (15h) | Turn plot mode off. |
| CTRL-V | (16h) | Cursor down one pixel. |
| CTRL-Y | (19h) | Cursor left one pixel. |
| CTRL-\ | (1Ch) | Home cursor. |
| CTRL-] | (1Dh) | Cursor right one character. |
| CTRL-_ | (1Fh) | Cursor right one pixel. |

The following is a complete list, with descriptions and examples, of all currently implemented "CONTROL" commands.

Most of these commands are best used as straight input from the keyboard instead of as output from a program.

Please note that the hexidecimal number following each CONTROL code is it's ASCII number. You will notice that to execute any of these commands from within a BASIC program you need only use the CHR$ function, or it's equivalent in other languages, with this ASCII number.

CTRL-C (03h)
Abort current command.
This command is not buffered and is executed IMMEDIATELY. This command affects the following processes:
Filled polygon
Filled arc
MODE >
MODE T
ESCAPE @
For buffered CTRL-C see MODE ^C
BASIC example: (Not normally used from within a program).

CTRL-D (04h)
Cursor up one pixel.
This control code allows the user to move the cursor up one pixel instead of one complete character.
When the cursor hits the top of the screen it will not wrap around to the bottom of the screen.
To move the cursor up one character see CTRL-K
BASIC example:

---
10 Rem - Move the cursor up 2 pixels
20 LPrint Chr$(&h4) + Chr$(&h4);
---

CTRL-G (07h)
Sound bell.
This sounds the bell in the host computer.
To make musical tones on the Quintar see ESCAPE T
BASIC example:

---
10 Rem - Sound the bell in the host computer
20 LPrint Chr$(&h7);
---

CTRL-H (08h)
Backspace one character.
Move the cursor to the left one characters width on the CRT.
If the cursor hits the left side of the screen it will not wrap around to the right side.
To move the cursor one pixel to the left see CTRL-Y
BASIC example:

---
10 Rem - Move the cursor to the left 3 characters
20 For a% = 1 to 3
30 LPrint Chr$(&h8);
40 Next a%
---

CTRL-K (0Bh)
Vertical tab (up one character).
Move the cursor up the heighth of one character.
If the cursor hits the top of the screen it will not wrap to the bottom of the screen.

To move the cursor up one pixel see CTRL-D
BASIC example:

---
10 Rem - Move the cursor up one character heighth
20 LPrint Chr$(&hB);

---

CTRL-L (0Ch)
Clear RGB monitor screen.
This will erase all of the images on the RGB monitor. To do this it will set every pixel color to be the background color.
Executing a soft boot (MODE=) or a cold boot (ESCAPE G) will also clear the RGB monitor.
BASIC example:

---
10 Rem - Clear the CRT
20 LPrint Chr$(&hC);

---

CTRL-M (0Dh)
Carriage return.
This will send the cursor back to column 1 (the left side of the screen) but leave it in the same row that it was in when this command was executed.
BASIC example:

---
10 Rem - Execute a carriage return
20 LPrint Chr$(&hD);

---

CTRL-P (10h)
Tells the Quintar that the next number will be a register number to read a single x or y coordinate from.
Normally when a command need a coordinate argument you must specify either a number or a dot meaning the current cursor coordinate. If you have a specific x or y part of a coordinate stored in a user-defined register and want to use it as an argument the CTRL-P command will let you.
For example register 30 has a value for x and register 35 has a value for y. To use these coordinates with the move cursor command (MODE U) you would do the following:
MODE U CTRL-P 30, CTRL-P 35,
BASIC example:

---
10 Rem - Execute the above example
20 LPrint Chr$(1) + "U";
30 LPrint Chr$(&h10) + "30," + Chr$(&h10) + "35,";

---

CTRL-U (15h)
Turn plot mode off.
This command sets the Quintar back into TEXT mode. This means that commands to draw circle, vectors, etc. will not be executed but instead the characters that make up those commands (i.e. *100200 40, for a circle) will be displayed on the RGB monitor.
The command MODE CTRL-U works the same as this command.
To turn PLOT mode on see MODE G
BASIC example:

---
10 Rem - Turn plot mode off
20 LPrint Chr$(&H15);

---

CTRL-V (16h)
Cursor down one pixel.
This command causes the cursor to move down one pixel on the CRT.
If the cursor hits the bottom of the screen it will wrap around to the top but remain in the same column.
To move down one character heighth see CTRL-J
BASIC example:

---
10 Rem - Move the cursor down 2 pixels
20 LPrint Chr$(&h16) + Chr$(&h16);

---

CTRL-Y (19h)
Cursor left one pixel.
This command causes the cursor to move to the left one pixel on the RGB monitor.
If the cursor hits the left side of the screen the cursor will wrap around to the right side but remain in the same row.
To move left one character width see CTRL-H
BASIC example:

---
10 Rem - Move the cursor left 1 pixel
20 LPrint Chr$(&h19);

---

CTRL-/ (1Ch)
Home cursor.
This command will move the cursor to the upper, left corner of the RGB monitor.
BASIC example:

---
10 Rem - Home the cursor
20 LPrint Chr$(&h1C);

---

CTRL-] (1Dh)
Cursor right one character.
This command will move the cursor one character width to the right.
If the cursor hits the right side of the screen it will wrap to the left side of the screen and down one line.
To move the cursor right one pixel see CTRL-_
BASIC example:

---
10 Rem - Move the cursor one character width right
20 LPrint Chr$(&h1D);

---

CTRL-_ (1Fh)
Cursor right one pixel.
This command allows the user to move the cursor one pixel to the right.
If the cursor hits the right side of the screen it will wrap to the left side of the screen but stay on the same line.
To move the cursor one character width to the right see CTRL-]
BASIC example:

---
10 Rem - Move the cursor 2 pixels to the right
20 LPrint Chr$(&h1F) + Chr$(&h1F);

---

End of CONTROL commands

"MODE" COMMANDS

The "MODE" commands are a set of commands that allow the user to define the drawing environment. They include commands to set the cursor type and color, define and set the display pages and display color lookup tables, define coordinate addressing type, and define text character attributes. There is also a miscellaneous "MODE" command that allows the user to execute a "soft boot" of the Quintar.

Please note:

All "MODE" commands begin with a CONTROL-A (01h)

All mode command characters can be sent as either upper or lower case.

The following is a complete summary of all MODE commands followed by a section with complete descriptions and examples, of all currently implemented "MODE" commands.

"MODE" Command Summary

| Command | | Description |
|---|---|---|
| MODE A | (n) | Set inter-line spacing to (n) pixels |
| MODE B | | Set binary mode for screen coordinates |
| MODE C | (h) | Set current foreground color to (h) |
| MODE E | | Set decimal mode for screen coordinates |
| MODE F | | Set fill on |
| MODE G | | Enter plot mode |
| MODE H | | Write text characters horizontally |
| MODE J | | Allow the cursor to be visible |
| MODE K | | Make the cursor invisible |
| MODE L | | Set fill off |
| MODE M | | Set background color flag on |
| MODE N | | Set background color flag off |
| MODE O | | Set overstrike active for one character |
| MODE Q | (c1) {(c2)} | Set cursor type or color |
| MODE T | (n) | Execute single diagnostic test (n) |
| MODE U | (x,y) | Move cursor to coordinate (x,y) |
| MODE V | | Write text characters vertically |
| MODE W | (x1,y1) (x2,y2) | Set window size |
| MODE X | (n) | Set character size |
| MODE Y | (n) | Set vertical character spacing |
| MODE Z | (n) | Zoom screen |
| MODE ! | | Display straight characters |
| MODE " | (c) | Complement mode |
| MODE # | (c) | Change the mode of the screen |

"MODE" Command Summary

| Command | | Description |
|---|---|---|
| MODE % | (hhhh) | Set pattern register |
| MODE + | | Allign pan address to cursor |
| MODE , | (c1) {(c2)} | Set display page or color lookup table |
| MODE − | (c) | Set coordinate mode |
| MODE . | (x,y) | Set starting display address for pan and tilt |
| MODE / | | Display text characters as slanted |
| MODE [ | | Unlatch overstrike |
| MODE ] | | Latch overstrike |
| MODE 4 | | Clear translation offset |
| MODE 5 | | Set translation offset to current cursor location |
| MODE : | (c1) {(c2)} | Select overlay plane(s) |
| MODE ? | (n) | Delay drawing (n) tenths of a second |
| MODE < | (c1) {(c2)} | Set page to draw |
| MODE > | (c,1) | Area fill |
| MODE = | | Soft boot |
| MODE   | (c1) ... | Change color lookup table values |

MODE A (n)

Set inter-line spacing.

This command can be used to set and/or change the spacing of text characters when they are displayed. The number n represents the number of pixels between the bottom of the current line character cells and the top of the cells on the next line. This number (n) must be an integer in the range of 0 to 255.

Characters are displayed using a 5×9 pixel dot matrix inside of a 6×10 pixel cell. As you can see with the tallest character being 9 and the cell heighth being 10 there will always be at least a 1 pixel space between one line and the next. This means that the actual inter-line spacing is actually (n)+1.

The default value is 0 pixels between cells.

BASIC example:

```
10 Rem - The following will set the interline spacing to 5
20 LPrint Chr$(1) + "A" + "5"
```

MODE B

Set binary mode for screen coordinates.

By setting the binary mode you will be able to enter both positive and negative x,y screen coordinates using 2 byte binary values. The bit and byte values are as follows:

| | Bit Positions | | | | | | | |
|---|---|---|---|---|---|---|---|---|
| | 7 | 6 | 5 | 4 | 3 | 2 | 1 | 0 |
| First byte | 0 | 1 | A5 | A4 | A3 | A2 | A1 | A0 |
| Second byte | 0 | 1 | S | X | E9 | A8 | A7 | A6 |
| Bits A0 to A8 are used for the Quintar Model 1000 | | | | | | | | |
| Bit E9 is used only for the Quintar Model 1080 | | | | | | | | |
| Bit X must always be set the same as bit S. | | | | | | | | |
| (It is reserved for future expansion.) | | | | | | | | |
| Bit S is the sign bit. | | | | | | | | |

To represent negative numbers first set bits A0 to A8 and E9 to represent the absolute value of the number. Set bits S and X to zero. Then use 2's complement on all bits A0 to A8, E9, S, and X as thought they were 1 word. Always make sure that bits 7 and 6 of both bytes are set to 0 and 1 respectively.

Examples:

Decimal 10 is represented by 01001010 01000000

Decimal −5 is constructed by first representing it's absolute value 01000101 01000000 and then using 2's complement to get the final representation of 01111011 01111111

(?) Is the above 2's complement example correct?

The default value is decimal mode (see MODE E)

BASIC example:

```
10 Rem - The following sets binary mode
20 LPrint Chr$(1) + "B"
```

MODE C (h)

Set current foreground color.

After setting the current drawing color, whenever a fill is done it will use this color.

The default color is taken from element 7h of the current color lookup table. If the table has default color values in it this will mean that the color will be white.

BASIC example:

```
10 Rem - Set the foreground color to the value of
11 Rem    element Ah of the current color lookup table
12 Rem    If the table has default values this is RED
20 LPrint Chr$(1) + "C" + "A";
```

MODE E

Set decimal mode for coordinates.

When in this coordinate mode, positive and negative x,y screen coordinates can be entered in any of the following 3 ways:
(1) 1 digit integer followed by a comma
(2) 2 digit integer followed by a comma
(3) 3 digit integer with leading zeros to fill out the number to 3 integer places You may separate numbers with a single space. This space will be ignored by the Quintar.

Examples:

07, 03,
100 486
3, 8,

The 3 types of integers can also be mixed.

Examples:

334 9,
4, 029
34, 2,

If the number you are entering is negative then you must precede the integer with a minus sign.

Examples:

−12, −007, −4,

To enter screen coordinates in with binary numbers see MODE B

Decimal mode is the default mode for entering screen coordinates.

BASIC example:

```
10 Rem - Set screen coordinate mode to decimal
20 LPrint Chr$(1) + "E"
```

MODE F
Set fill on.

When fill is set to ON, circles, polygons, and rectangles will be filled with the current foreground color after the shape has been closed.

To set the current foreground color see MODE C
To turn fill off see MODE L
Default is fill off.
BASIC example:

```
10 Rem - Set fill on
20 LPrint Chr$(1) + "F"
```

MODE G
Enter plot mode.

By entering plot mode, the user is telling the Quintar to execute all characters sent to it as commands and not to display them on the RGB monitor as text.

For example in text mode if we sent the characters *100200300 to the Quintar they would be displayed just as you see them. However in plot mode those same characters would tell the board to draw a circle starting at location (100,200) with a radius of 300 pixels.

To set the mode to text mode see CTRL-U
The default setting is text mode.
BASIC example:

```
10 Rem - Enter plot mode
20 LPrint Chr$(1) + "G"
```

MODE H
Write text characters horizontally.

In MODE H all text characters sent to the RGB monitor will be displayed in a horizontal orientation to each other, from left to right, starting at the current cursor position.

If more characters are sent than can be displayed on one line, they will automatically wrap around to the left side of the screen and the cursor will be moved down one line. If the characters try to go beyond the bottom, right corner of the screen they will also wrap around to the top, left corner of the screen.

To display characters vertically see MODE V
To change the size of the characters being displayed see MODE X and MODE Y
Default value is horizontal mode on.
BASIC example:

```
10 Rem - Set character printing to horizontal
20 LPrint Chr$(1) + "H"
```

BASIC example:

```
10 Rem --  Print the word "QUINTAR" on the RGB monitor
20 LPrint   "QUINTAR"
   Screen
```

MODE J
Allow the cursor to be visible.

When MODE J is set then the cursor will be displayed on the screen. To make the cursor invisible see MODE K. To set the type of cursor you are using see MODE Q.
BASIC example:

```
10 Rem - Turn on the cursor
20 LPrint Chr$(1) + "J"
```

MODE K
Make the cursor invisible.

By using this command, the cursor will never be allowed to display.

To turn the cursor back on see MODE J
To set cursor attributes see MODE Q
Default is cursor on.
BASIC example:

```
10 Rem - Turn off the cursor
20 LPrint Chr$(1) + "K"
```

MODE L
Set fill off.

Any completed shapes (circle, rectangle, polygon) will not be filled when they are drawn.

To turn fill on see MODE F
Defualt is fill off.
BASIC example:

```
10 Rem - Set fill off.
20 LPrint Chr$(1) + "L"
```

MODE M
Set background color flag on.

When this flag is activated, the Quintar will know to use the all of the following "change color commands (MODE C)" to set the background color.

To deactivate this flag so the change color command again changes the foreground color see MODE N The default color for the background is the element Oh of the current color lookup table. If the table has default values then this color will be black.

To set the background color flag off see MODE N
BASIC example:

```
10 Rem - Set background color flag on.
20 LPrint Chr$(1) + "M"
10 Rem - Set background color to lookup table element 1h
11 Rem   If the lookup table has default values then
12 Rem   this color will be BLUE
20 LPrint Chr$(1) + "C" + "1";
```

MODE N
Set background color flag off.

This command resets the change background color flag. It is the opposite of MODE M above. After this command is executed all further change color commands (MODE C) will change the foreground color as usual.

To set the background color flag on see MODE M
BASIC example:

```
10 Rem - Set background color flag off
20 LPrint Chr$(1) + "N";
```

MODE O
Set overstrike active for one character.

This command allows the user to overstrike a single text character that is already displayed on the RGB monitor. After the single character is has been overstruck, any other text sent to the RGB monitor will be displayed normally.

To latch the overstrike mode see MODE ]
BASIC example:

```
10 Rem - The following will make a standard plus-minus
11 Rem   sign with the minus sign directly under the plus
12 Rem   in the same character cell.
13 Rem
20 Rem - Print the plus sign
21 LPrint "+";
30 Rem - Backspace over it (backspace is non-destructive)
31 LPrint Chr$(8);
40 Rem - Set overstrike active for one character
41 LPrint Chr$(1) + "o";
50 Rem - Print the minus sign as an underline so it
51 Rem   will be under the plus and not through it
52 LPrint "-";
```

MODE Q (c1) {(c2)}
Set cursor type or color.

This mode command will allow you to specify the type of cursor you want displayed as well as what color the cursor should be. The variable (c) can be replaced by the following values:
  R will set the cursor to rubber band mode.
  N will turn rubber band mode off.
  T followed by one of the following characters will change the type of the cursor being displayed:
    + for plus shaped cursor
    C for cross hair cursor To specify the cursor color simply follow the MODE Q with a color index (hexidecimal 0 to F) to use from the current color lookup table.

The cross hair cursor will always display a horizontal line from the top of the screen to the bottom and a vertical line from the left side of the screen to right side.

In rubber band mode the color of the rubber band will always be the same as the color of the cursor.
BASIC example:

```
10 Rem - Set rubber band mode
20 LPrint Chr$(1) + "Q" + "R"
10 Rem - Set cursor to lookup table color 5
20 LPrint Chr$(1) + "Q" + "5"
10 Rem - Set cursor to cross hair-type
20 LPrint Chr$(1) + "Q" + "T" + "C"
```

MODE T (n)
Execute single diagnostic test of Quintar.

This command allows you to execute any of the 11 diagnostic tests independently of each other. For a list of these tests please refer to the testing section at the beginning of this manual. To abort any test simply enter a control-C. The argument (n) must be an integer from 1 to 11.

There is no default for this command.
BASIC example:

```
10 Rem - Run diagnostic test 3 (grey scale)
20 LPrint Chr$(1) + "T" + "3,"
10 Rem - Run diagnostic test 9 (zoom test)
20 LPrint Chr$(1) + "T" + "9,"
```

MODE U (x,y)
Move cursor to coordinate (x,y)

This command is fairly self-explanatory. As you can see all you need to do for this command is give the coordinates and the cursor will move to that position on the RGB monitor.
BASIC example:

```
10 Rem - Move cursor to (100,80)
20 LPrint Chr$(1) + "U" + "100080";
10 Rem - Move the cursor to (10,65)
20 LPrint Chr$(1) + "U" + "10,65,";
```

MODE V
Write text characters vertically.

When text is sent to the RGB monitor it will be displayed starting at the current cursor position and will continue in a vertical orientation, top to bottom. If the characters hit the bottom of the screen they will wrap around to the top of the screen but they will stay in the same column.

To display characters in a horizontal fashion see MODE H

To change the vertical spacing of the characters as they are being displayed see MODE A and MODE Y To change the size of the characters see MODE X
Default is to display characters horizontally.
BASIC examples:

```
10 Rem - Set character mode to display vertically
20 LPrint Chr$(1) + "V";
10 Rem - Print "QUINTAR" vertically
20 LPrint Chr$(1) + "V"
30 LPrint "QUINTAR"
```

-continued

```
Screen
Q
U                         o
I
N
T
A
R
10 Rem - Display all of the printable characters
11 Rem vertically in 1 column
20 For Char.number % = 33 to 126
30 LPrint Chr$ (Char.number %);
40 Next Char.number %
```

MODE W (x1,y1) (x2,y2)
Set window size.

This command allows the user to set the size of the window anywhere from the full size of the screen to a 1 pixel by 1 pixel window. The window can be anywhere on the screen. The two coordinate arguments to this command are any 2 opposite corners of the window (just as thought you were specifying a rectangle with the + command). The addressing of the window is the same whether it is a full screen window or smaller. That is the lower, left corner of the screen is always (0,0) unless you have set register offsets (see MODE -). You can address areas outside of the window by simply giving their coordinates.

If you wish to address the lower, left corner of the window as (0,0) even though it is not physically in the lower, left corner of the screen simply set the coordinate register offsets (with MODE -) to be the lower, left corner of the window. Then, for example, address (0,0) will be added to these offsets and will place you at the lower, left point of the window as you wanted.

To set the window size back to the size of the screen simply use a single dot to specify x1,y1 and another single dot to specify x2,y2.

When you reset the window size back to the full screen size don't forget to reset the coordinate offsets (with MODE 4) too if you had set them.

The defualt window consists of the complete screen.

For more information on drawing with windows see the section entitled "Windows".

BASIC examples:

```
10 Rem - Set the lower left corner of the window at
100, 200 and the upper, right corner at
300, 400.
20 LPrint Chr$(1) + "W" + "100200" + "300400";
10 Rem - Set the window back to the full screen size
20 LPrint Chr$(1) + "W" + "." + "."
```

MODE X (n)
Set character size.

The standard character size is 6×10 pixels. To increase that size you can use this MODE X command. The argument to this command is multiplied by both the heighth and width of the standard character size to give you the new size. The argument (n) can be any integer from 1 to 16. If the argument is 11 for example, that will be multiplied by 6 to get a width of 66 pixels and multiplied by 10 to get a heighth of 110 pixels.

Default is size 1 where character is a 5×9 matrix displayed using a 6×10 grid.

BASIC examples:

```
10 Rem - Set character size to 3 (i.e. a 18 × 30 grid)
```

```
20 LPrint Chr$(1) + "X" + "3,";
10 Rem - Set character size back to standard 6 × 10 pixels
20 LPrint Chr$(1) + "X" + "1,";
```

MODE Y (n)
Set vertical character spacing.
(?) Should we leave this out of the documentation for now?
BASIC example:

```
10 Rem -
20 LPrint Chr$(1) +
```

MODE Z (n)
Zoom screen.

This allows you to zoom in on the upper, left corner of the current window. The argument to this command can be any integer between 1 and 16 which represents the amount of zoom you want. A zoom of 1 is the least and a zoom of 16 will zoom in on approximately 1/100th of the full screen.

This is an absolute zoom meaning that once you have zoomed in on part of the screen you cannot then zoom in 16 times on the remaining screen. For instance if you first zoom in 4 then you can only zoom in 12 on the new screen.

The argument (n) is actually the multiplier for the pixel size. If you want to zoom in 5 on the full screen, what will actually appear when the zoom is done is the following. Divide the screen into 5 even sections both vertically and horizontally. The rectangle that you get in the upper, left corner of the screen will be the image that will fill the new screen.

BASIC example:

```
10 Rem - Zoom in a factor of 5
20 LPrint Chr$(1) + "Z" + "5,";
```

MODE !
Display straight characters.

This command will make all characters displayed on the RGB monitor have a vertical orientation. This means that the legs of the capitol letter "M" for example will be parallel with the left and right edges of the screen.

For an example of straight and slanted characters see MODE /

For slanted characters see MODE /
The default is straight characters.
BASIC example:

```
10 Rem - Set character display mode to straight characters
20 LPrint Chr$(1) + "!"
```

MODE " (c)
Complement mode.

When shapes or lines are drawn on the RGB monitor there is usually going to be an overlap. If the overlapping lines are the same color then there is no problem since there is no need to decide which color to display. If however the over lapping lines are of 2 different colors there are 2 problems. The first is what color should be used to display the overlap. Second, what happens is one of the lines is later removed? How do we know what color to use to display the remaining dot?

By using this mode command you can choose which of the above answers you want. The "replace" choice of this command will always use the most current line color as the one to display when two lines intersect. If one of those lines is later removed then the resulting point is no longer overlapped but the original color is also lost. This means that the new color for that point will be the background color.

The other option of this command is the "complement" choice. When this option is activated then the resulting color for two overlapping lines will be a complement of the two individual colors of the lines. When one of the lines is later removed the colors can again be complemented and the orginal color can be recalculated and displayed.

To set "replace" mode use the letter R for the argument. For the "complement" mode use the letter C for the argument.

The default choice for this command is "replace".
BASIC example:

```
10 Rem - Set complement mode to "replace"
20 LPrint Chr$(1) + Chr$(34) + "R"
```

MODE # (c)
Change the mode of the RGB monitor.
The argument (c) can be replaced with the following values:
B for blank screen.
U for unblank screen.
F for fast draw mode.
W for wait mode.

The blank screen mode causes the RGB monitor to go to the background color and remain there until an unblank command. This allows you to draw at a much faster rate since there is no refresh cycle for the screen. Once you are finished drawing to the screen, issue an unblank command and your picture will appear.

For the fast draw mode you will see some flickering on the RGB monitor since drawing will be going on at the same time as the picture is being displayed. The fast draw mode simply cuts down the number of times the picture is refreshed and uses the extra time that has been freed up to do more drawing.

The standard mode is wait mode. This allows you to display and draw at the same time but because the picture is kept totally refreshed the drawing time will be slower.

Default mode is wait mode.
BASIC example:

```
10 Rem - Set screen mode to blank
20 LPrint Chr$(1) + "#" +"B"
30 Rem - Draw to the screen here
40 Rem - Set the screen back to unblank
50 LPrint Chr$(1) + "#" + "U"
60 Rem - Your picture now appears on the screen
```

MODE % (hhhh)
Set pattern register.

The pattern register is used as a template to draw lines. This means that whenever you issue a vector command or draw an unfilled circle or an unfilled polygon, the pattern used to draw the line around these shapes will be taken from this register.

Normally the pattern register holds FFFFh. This means that all bits are turned on so you will get a solid line pattern. If you were to set the pattern register to FOFOh you would get a dotted line pattern. By using this register you can get just about any type of line you want.

One other feature of this register is that it is used when doing solid fills too. If you want a filled circle that looked like a ball for instance you could use the pattern EEEEh. This would cause curved lines to follow the circumfrence of the circle.

The default value for the pattern register is FFFFh.
BASIC example:

```
10 Rem - Set pattern register to a dotted line
20 LPrint Chr$(1) + "%" + "FOFO"
```

MODE +
Align pan address to cursor.
This gives the Quintar the coordinate at which to do pan and tilts around.
(?) For an explanation of pan and tilt see command ???
(?) What does the actual pan and tilt?
This is the same as MODE . .
BASIC example:

```
10 Rem - Allign pan address to cursor
20 LPrint Chr$(1) + "+";
```

MODE , (c1) . . .
Set display page or color lookup table.

This command has two functions. If you are using the Quintar 1000 which has 2 separate pages of display data this command will allow you to switch between the displaying of one page and the other. If you are displaying a picture, you can be constructing another picture in the other display page. Therefore when the second picture is completely drawn you can instantaneously display the next picture.

This mode command allows you to either choose display page 1 or 2 or allows you to simply flip from one page to the next and back again without having to keep track of whether you are on page 1 or 2.

All models of the Quintar have 2 separate color lookup tables. This command also allows you to switch between these.

As with the display page, the mode command allows you to switch between lookup table 1 and table 2 or you can switch from one to the other and back again without keeping track of whether you are using table 1 or 2. As soon as you switch to a new lookup table the screen display colors will change to correspond to the new color lookup table definitions.

Default display page is 1.
Default color lookup table is 1
BASIC examples:

```
10 Rem - Switch to display page 2
20 LPrint Chr$(1) + "," + "2"
10 Rem - Switch to color lookup table 2
20 LPrint Chr$(1) + "," + "L" + "2"
10 Rem - Switch to "other" display page
20 LPrint Chr$(1) + "," + ">"
10 Rem - Switch to "other" color lookup table
20 LPrint Chr$(1) + "," + "L" + ">"
```

MODE — (c)
Set coordinate mode.

The Quintar allows you to specify screen locations in a number of ways. This mode command allows you to choose the manner in which you want to send coordinates to the Quintar. The following choices exist:

A for absolute addressing (default)
R for relative addressing
T for translation offset followed by (x,y)
M for mask followed by (hhhh)(hhhh)
Note: The translation and mask offsets affect all coordinate entries except the period (".") mode.

The absolute addressing mode means that all coordinates that are sent to the Quintar are assumed to originate at (0,0). If no offsets or masks are being used that point will be the lower, left corner of the screen.

In the relative addressing mode, all coordinates sent are assumed to be relative to the current location of the cursor. This means that the x and y axis of the imaginary screen graph are both draw through the current cursor location. Therefore location (0,0) would be directly on the cursor, (1,0) would be 1 pixel to the left of the cursor, and (0,−5) would be 5 pixels below the cursor.

The translation mode actually does two things at the same time. First it tells the Quintar that all future coordinates are going to added to the x and y translation before they are used. Second it allows you to define what the x and y translation values are going to be. The values that x and y can take include any positive or negative integer as defined under the 3 number types in MODE E.

Therefore if we set x translation to 2 and y translation to 5 and we send the coordinates 8 and 9 to the board the actual coordinates that will be used are 10 (which is 2+8) and 14 (which is 5+9).

The final mode is mask mode. This allows great flexibility by letting the user enter and store a mask for both coordinates. The coordinates that are sent to the Quintar are AND'ed with these masks and the resulting value is used as the actual coordinate.

The ESCAPE Z command can also be used to set the mask and translation as well as move the cursor and setup the window. However it isn't recommended that you use the ESCAPE Z command since the other commands to do these things are easier to use and therefore harded to make mistakes on.

With the MODE — command you can combine relative or absolute addressing with either mask or translation. You can even do both mask and translation in the same action. The built in precidence will always execute the mask of the coordinate before executing the translation.

BASIC examples:

```
10 Rem - Set absolute coordinate mode
20 LPrint Chr$(1) + "—" + "A";
10 Rem - Set translation mode using x offset 10 and
   y offset 20
20 LPrint Chr$(1) + "—" + "A" + "10,20,";
30 Rem - All further coordinates will have 10 added to
   the x and 20 added to the y before use.
```

MODE . (x,y)
Set starting display address for pan and tilt.
The command MODE . . is the same as MODE +
The default pan and tilt starting address is the upper, left corner of the screen.
BASIC example:

```
10 Rem - Set the starting display address to 10,30
20 LPrint Chr$(1) + "." + "10,30,";
```

MODE /
Display text characters as slanted.
By setting this mode on, all text characters that are displayed will be slanted. This means that in the case of a capitol "M" for example, the legs will NOT be parrallel to the left and right sides of the screen. This "M" will look as though the bottom of the character stayed in the same place but the top was stretched to the right a few pixels depending on the character size.

See MODE ! for straight characters.
Sample screen:

Straight character

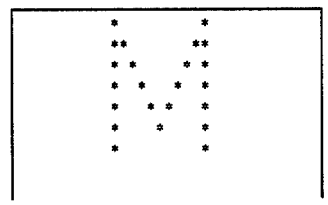

Slanted character

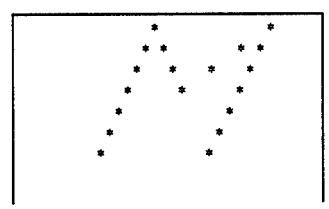

(Note: the above screens examples are not to scale)

Default character mode is straight.
BASIC example:

```
10 Rem - Set character mode to slanted
20 LPrint Chr$(1) + "/"
```

MODE [
Turn overstrike off.
The overstrike commands effect the display of text characters. It can effect either text characters displayed on top of each other in the same character cell or it can effect text displayed on top of images.
For a complete description of overstrike, see MODE ]
To turn overstrike ON see MODE ]
Default is overstrike OFF.
BASIC example:

```
10 Rem - Turn overstrike off
20 LPrint Chr$(1) + "[";
```

MODE ]
Turn overstrike ON.
The overstrike mode effects the display of text characters on the CRT. Normally only one character can be displayed in a character cell. This means that if the character A is in a cell and we then print the character B in that same cell the character A will disappear.

The same goes for a character being displayed where part of an image is already drawn. Normally the image piece will go away and the character will be displayed in the foreground color and the complete character cell will be displayed in the background color.

If we want to display 2 characters in the same cell, or if we want to display a character over a piece of an image and don't want to ruin the continuity of the image then we can use overstrike.

Once overstrike is turned ON, all character display will become non-destructive. That is characters can be displayed more than one to a cell and characters displayed over a part of an image will not effect the image other than in the few places where the pixels have to become active to display the character.

To turn overstrike OFF see MODE [

Default is overstrike OFF.

BASIC example:

```
10 Rem - Turn overstrike ON.
20 LPrint Chr$(1) + "[";
```

MODE 4

Clear translation offset.

This sets the x and y translation offsets to 0. For a definition and explanation of these translation offsets see MODE —

To set the translation offsets see MODE — or MODE 5

This command is the same as executing "MODE — T 0, 0,"

Default value for the translation offset is 0 for both x and y.

BASIC example:

```
10 Rem - Clear the translation offsets
20 LPrint Chr$(1) + "4";
```

MODE 5

Set translation offset to current cursor position.

This will read the current x and y cursor coordinates from the screen and store those two numbers as the translation offsets. For a complete explanation of translation offsets please refer to MODE —

To clear the translation offsets see MODE 4

To set the translation offsets to something other than the current cursor coordinates see MODE —

This command is the same as executing "MODE — T."

Default is translation offset set to 0 for both x and y.

BASIC example:

```
10 Rem - Set translation offsets to current cursor
15 Rem coordinates
20 LPrint Chr$(1) + "5";
```

MODE: (h)

Select color overlay planes.

Default is all overlay planes active. This is the same as executing command "MODE: F"

(Place diagrams for explanation here)

BASIC example:

```
10 Rem - Make all planes active
11 Rem This means all four planes will be 1's
12 Rem binary 1111 = hexideciaml F
20 LPrint Chr$(1) + ":" + "F";
10 Rem - Make planes 1 and 3 active. This means
11 Rem that planes 0 and 2 will be off or 0 and
12 Rem planes 1 and 3 will be on or 1.
13 Rem binary 1010 = hexidecimal A
20 LPrint Chr$(1) + ":" + "A";
```

MODE ? (n)

Delay drawing.

This mode command will allow you to temporarily suspend the drawing of a picture for up to 59.9 seconds at a time. This can be used to highlight or point out a specific feature of a picture before it is obscured by the remainder of the picture.

The argument value for (n) can be any integer from 0 to 599. This number represents the number of tenths of a second that you wish to pause (i.e. delay time is (n)/10 seconds).

BASIC example:

```
10 Rem - Delay the drawing of the picture for 3 seconds
20 LPrint Chr$(1) + "?" + "30,";
```

Mode < (c1) {(c2)}

Set page to draw.

Whereas the MODE , command allows you to choose which page to display or which color lookup table to use, this command allows you to specify which page or lookup table to write to.

All of the commands are the same as those defined and explained under MODE , with the addition of the "copy color lookup table" command. This command allows you to copy the color definitions from the current table being used to display a picture to the table being defined. This can be used to create a duplicate lookup table and then to change only one or two colors. By doing this you only need to change these one or two colors instead of redefining the other 14 or 15 colors.

To change color lookup table values see MODE ^

To change page being displayed or lookup table being used to display see MODE ,

Default is write to display page 1 and color lookup table 2.

BASIC examples:

```
10 Rem - Change to display page 1 to draw picture
20 LPrint Chr$(1) + "<" + "1"
10 Rem - Change to "other" page to draw picture
20 LPrint Chr$(1) + "<" + ">"
10 Rem - Set current color lookup table to 1
20 LPrint Chr$(1) + "<" + "L" + "1"
30 Rem - Copy "other" lookup table to current table 1
40 LPrint Chr$(1) + "<" + "L" "C"
```

MODE > (c)

Area fill.

Once you are in the middle of a predefined and closed area, by issuing this command that area will be filled. The (c) argument to this command is a dummy and can be any character. The color that will be used to fill the area is the foreground color. Filling of the area will start at the current cursor location.

To change the fill color see command MODE C

BASIC example:

```
10 Rem - Fill the area that the cursor currently resides
15     in with the current fill color.
20 LPrint Chr$(1) + ">" + "a"
```

MODE=
Soft boot.

This command will cause the Quintar board to execute a soft boot. Following each explanation is the exact command used to execute that action. The actions that take place in a soft boot include:

(1) Reset all mode flags
   (a) Set to absolute coordinate mode
      MODE— A
   (b) Set plot off (sets mode to text mode)
      ^U
   (c) Set to decimal mode
      MODE E
   (d) Set cursor on
      MODE J
   (e) Set fill off
      MODE L
   (f) Set background off
      MODE N
   (g) Set blink off
      MODE 2
(2) Set interline spacing to 0 pixels
      MODE A 0
(3) Initialize character flags
      MODE H
(4) Zoom to absolute 1 which is no zoom
      MODE Z 1
(5) Set character width multiplier to 1
      MODE X 1,
(6) Set character heighth multiplier to 1
      MODE Y 1,
(7) Set display position to home
(?)
      MODE. 0, 0,
(8) Set window to maximum screen size
      MODE W . .
(9) Place cursor in home position
      \
(10) Set translation offsets to 0 for both x and y
      MODE 4
(11) Set both x and y coordinate masks to FFFF
      MODE— M FFFF FFFF
(12) Set colors to the following:
   (a) Foreground to lookup table element 7h (default=white)
      MODE C 7
   (b) Background to lookup table element 0h (default=black)
      MODE M
      MODE C 0
      MODE N
   (c) Cursor to lookup table element Fh (default=white)
      MODE Q F
(13) Set all overlay planes to active
      MODE: F
(14) Set cursor to plus ("+") type
      MODE Q T +
(15) Set rubber band mode off
      MODE Q N
(16) Set complement mode to off
      MODE " R
(17) Set all bits in pattern register to on (Store FFFFh)
      MODE % FFFF
(18) Reset coordinate table
   (?) What command?
BASIC example:

```
10 Rem - Execute a soft boot
20 LPrint Chr$(1) + "="
```

MODE ^ (c1) . . . .
Change LUT values.

Both color lookup tables have 16 positions. Each of these positions has 3 hex digits; the first representing the intensity of red, the second the intensity of green, and the third the intensity of blue. By changing each of these values you can make any color in the rainbow very much like mixing paint.

For example the color represented by the hex digits F00H means that the intensity of red is at it's highest and the intensities of both green and blue are at their lowest, or off. This creates the color bright red. The color represented by FFFh means that all three colors are at their highest intensity which translates to black. Inversely the color 000h is white since all three colors are turned off.

The following is a graphic representation of a color lookup table:

|          | RED | GREEN | BLUE |                            |
|----------|-----|-------|------|----------------------------|
| Color 0h | !0  | 0     | 0!   | (represents black)         |
| Color 1h | !1  | 5     | A!   |                            |
| Color 2h | !8  | A     | 3!   |                            |
| Color 3h | !F  | F     | F!   | (represents white)         |
| Color 4h | !9  | D     | A!   |                            |
| Color 5h | !3  | 5     | 2!   |                            |
| Color 6h | !8  | 0     | 0!   | (represents medium red)    |
| Color 7h | !8  | 2     | E!   |                            |
| Color 8h | !0  | 0     | F!   | (represents light blue)    |
| Color 9h | !0  | 1     | 0!   | (represents dark green)    |
| Color Ah | !1  | 5     | D!   |                            |
| Color Bh | !5  | 5     | 5!   | (represents a medium dark grey) |
| Color Ch | !F  | 5     | A!   |                            |
| Color Dh | !F  | F     | 0!   |                            |
| Color Eh | !3  | D     | 7!   |                            |
| Color Fh | !1  | F     | A!   |                            |

NOTE:
All of the colors in the above table were chosen at random for this example. There are over 4000 colors that can be displayed. Each of the 16 active colors in each table can be set by you using the MODE ^ command.

The argument value to this command (c1) can be any of the following:

(1) The equals sign ("=") sets all colors in the lookup table to their default values. These values are:

| Location | Color |
|----------|-------|
| 0        | 000   |
| 1        | 00F   |
| 2        | 0F0   |
| 3        | 0FF   |
| 4        | F00   |
| 5        | F0F   |
| 6        | FF0   |
| 7        | FFF   |
| 8        | 000   |
| 9        | 00F   |
| A        | 0F0   |
| B        | 0FF   |
| C        | F00   |
| D        | F0F   |

-continued

| Location | Color |
|---|---|
| E | FF0 |
| F | FFF |

(2) Hex digits "0" to "F" allow you to change only one cell in the lookup table to a new color. The hex digit must be followed by three more hex digits specifying the new color for that cell.
(3) An asterisk ("*") which specifies that you want to change all or part of every cell in the table. The asterisk must be followed by one of these values:
   (a) "A" to change every color in the complete table. This letter must be followed by 16 sets of three hex digits specifying the complete colors for every cell in the table.
   (b) "R" to change only the red value of each cell. This command must be followed by 16 hex digits, one for each of the 16 cells of the table. These 16 new hex digits will replace the 16 current hex digits which represent the red shade.
   (c) "G" to change only the green value of each cell. See (b) above for explanation.
   (d) "B" to change only the blue value of each cell. See (b) above for explanation.

The following are approximate colors for different number combinations:

| Hex Number RGB | Resulting Color | Hex Number RGB | Resulting Color |
|---|---|---|---|
| 000 | Black | | |
| F00 | Light red | | |
| 0F0 | Light green | | |
| 00F | Light blue | | |
| 777 | Medium grey | | |
| FFF | White | | |

BASIC examples:

```
10 Rem - Change the color in cell 7 to 0D3h
20 LPrint Chr$(1) + "*" + "7" + "0D3"
10 Rem - Change all of the red's in all of the cells
20 LPrint Chr$(1) + "*" + "R" + "13F8AD57EB9C72D0"
10 Rem - Change all of the colors in all of the cells
20 LPrint Chr$(1) + "*" + "A";
30 LPrint "18F";
31 LPrint "9D2";
32 LPrint "882";
33 LPrint "FFF";
34 LPrint "F33";
35 LPrint "8E2";
36 LPrint "991";
37 LPrint "123";
38 LPrint "8FA";
39 LPrint "99C";
40 LPrint "9F9";
41 LPrint "CC1";
42 LPrint "FEC";
43 LPrint "8DE";
44 LPrint "92F";
45 LPrint "FE7"
```

End of MODE commands

"ESCAPE" COMMANDS

The ESCAPE commands are made up of many types of commands. These include commands to change the parameters of the serial ports, to setup the hardcopy exposure parameters, and various other switches.

Please note:
All "ESCAPE" commands begin with an ESCAPE character (1Bh)
All "ESCAPE" command characters can be sent as either upper or lower case.

Summary of ESCAPE Commands

The following is a complete summary of all commands. It is suggested that you skim this section before proceding to learn each command in detail. The detailed descriptions of each ESCAPE command follow this summary.

| Command | Description |
|---|---|
| ESC ESC (c) | Set pass or catch commands mode. |
| ESC A (c1) (c2) . . . (cn) | Activate peripheral device (c1), (c2), . . . and (cn). |
| ESC D (c) | Activate or deactivate debug mode. |
| ESC G | Execute a cold-boot of the Quintar. |
| ESC M (c1) . . . | Hard copy control commands. |
| ESC R (c1) (c2) | Set communications baud rate. |
| ESC S (c1) (c2) | Set parity and byte width parameters for a single port. |
| ESC T (n1) (n2) | Make a tone (n2) for a specified length of time (n1). |
| ESC X (c1) (c2) | Set handshaking parameter (c2) for port (c1). |
| ESC Y (d) | Transmit current cursor coordinate to logical device (d). |
| ESC @ (c1) (c2) . . . | Get input from peripheral device. |
| ESC = (n) | Set number of hard copies to (n). |
| ESC ? (d) (c) | Transmit statistical information (c). (Argument (d) is a dummy and should be set to 0 always.) |

The following is a complete list, with descriptions and examples, of all currently implemented "ESCAPE" commands.

ESC ESC (c)

Set pass or catch commands mode.

This command allows the user to pass commands into one SIO port on the Quintar and out the other without the commands being interpreted or executed. To pass the commands through the Quintar replace the argument (c) with the letter P. To catch the commands and have them executed by the board replace argument (c) with the letter C.

One use of this command is so the user can attach a terminal to the Quintar board SIO 1 port and a modem to the SIO 2 port and then an application program can switch from pass to catch and back again at any time.

This is the software equivelent of DIP Switch #1 — bit 3.

BASIC example:

```
10 Rem - Change to PASS mode
20 LPrint Chr$(27) + Chr$(27) + "P";
10 Rem - Change to CATCH mode
20 LPrint Chr$(27) + Chr$(27) + "C";
```

ESC A (c1) (c2) . . . (cn)

Activate peripheral device (c1), (c2), . . . and (cn)

This command allows you to activate one or more peripheral devices at a time so they can be used for input or output. The arguments (c1), (c2), . . . to (cn) must be replaced with values from the following table:

| Value | Meaning |
|---|---|
| M | Mouse |
| P | Polariod Palette |
| T | Tablet |
| N | None (deactivate all devices) |

Note that this command only activates the device but does NOT change any of the SIO device parameters such as baud rate, etc.

BASIC example:

```
10 Rem - Activate the mouse
20 LPrint Chr$(27) + "A" + "M";
10 Rem - Activate the tablet and the mouse
20 LPrint Chr$(27) + "A" + "T" + "M";
```

ESC D (c)

Activate or deactivate debug mode.

The debug command is designed to make it very easy for a user to debug his program by being able to view the actual commands that are being received by the Quintar. By attaching a standard terminal to the auxillary RS-232 port on the back of the Quintar and setting the debug mode to active, all commands that are sent to the Quintar will not only be executed but will also be passed back out the auxillary RS-232 port and displayed on the terminal.

To activate the debug mode replace the argument (c) with the letter A. To deactivate the debug mode use the letter D.

Note that the SIO port settings do NOT change when debug is activated.

This is the software equivelent of DIP Switch #1 — bit 7. See the explanation of this switch under the section entitled "Setting the DIP Switches" for more details.

BASIC example:

```
10 Rem - Activate the debug mode
20 LPrint Chr$(27) + "D" + "A";
10 Rem - Deactivate the debug mode
20 LPrint Chr$(27) + "D" + "D";
```

ESC G

Execute a cold-boot of the Quintar.

The following actions occur during a cold-boot. The commands following each explanation are the actual commands that are executed for each action.

(1) Execute a soft boot.
  MODE =
(2) Reset color lookup tables to their default colors.
  MODE ^ =
  MODE < L >
  MODE =
(3) Set color lookup table 1 active.
  MODE, L 1
(4) Set display page 2 active.
  MODE < 2
(5) Clear the screen.
  ^ L
(6) Set display page 1 active.
  MODE < 1
(7) Clear the screen.
  ^ L
(8) Display page 1
  MODE, 1
(9) Deactivate all peripheral devices (mouse, palette, etc.)
  ESCAPE A N
(10) Reset film RAM tables
  ESCAPE M =
(11) Set file type to 1
  ESCAPE M F 1
(12) Set number of hard copies to 1
  ESCAPE = 1
(13) Kill all macros
  ESCAPE K O
(14) Set mouse sensitivity to 0
  ESCAPE @ M S O, BASIC example:

```
10 Rem - Execute a cold-boot of the Quintar
20 LPrint Chr$(27) + "G";
```

ESC M (c1) . . .

Hard copy control commands.

The Quintar currently only has an automatic driver built in for the Polaroid Palette camera. The following setting apply only to this driver. For all other cameras the exposure and it's settings must be made by hand on the camera itself and can't be made by software.

The following table details the setting that can be made for the Polaroid Palette:

E Expose picture

This command must be followed by another argument telling what part of the picture to expose. These arguments are:

A Expose all colors (Red, Green, and Blue)
R Expose only the Red
G Expose only the Green
B Expose only the Blue Note: If the Palette is turned OFF or doesn't respond to an abort send a CTRL-C F Select film type This command must be followed by another argument telling the camera what type of film is being used. These arguments are:

1 Polaroid 669 type film
2 Polachrome 35 mm type film
3 Kodak Ektachrome type film S Shutter control This command must also be followed by another argument telling the camera what to do with the shutter. This argument can either be O to Open the shutter or C to Close the shutter and advance the film.

= Reset the film color lookup table to it's original values

The camera has it's own color lookup table that is separate and apart from the other two color lookup tables. It functions the same however in that it has the same number of colors (16) and they are addressed with single hexidecimal digits (O to F). The colors can be changed with the ESCAPE M command explained below.

The only difference is that instead of the colors being defined with three hexidecimal digits (one each for Red, Green, and Blue) each color is defined by an integer between 0 and 999. Therefore to specify a color made up of medium Red, medium Green, and medium Blue the argument would be 500, 500, 500, for whatever lookup table element you wanted to store the color in.

The default values are the same as for the standard color lookup tables except that each hexidecimal F is replaced by the integer 999. These values are listed under the MODE ^ command.

^Change a single element in the film color lookup table

The film lookup table is explained under the ESCAPE M=command above.

To change a single color in the table this argument must be followed by four more arguments. The first being the element of the table to change. This is a hexidecimal digit from 0 to F. The next three arguments are the new intensities of Red, Green, and Blue to place in that position. Each of the intensities are specified with an integer between 0 and 999.

Each of the following four arguments work very much the same. They each effect the timing of the picture, either the complete picture or one color in the picture. Each of the following arguments must be followed to two other arguments.

The first being which color to effect. This can be the letter A for All of the colors, R for Red only, G for Green only, or B for Blue only.

The second additional argument is the number to add, subtract, multiply, or divide by depending on which of the four choices you made below. This number must be an integer between 0 and 999. The range for division is 1 to 999.

For example to add to the exposure time of Green by 10 the command would be: ESC M + G 10, To divide all of the color exposure times by 3 would be: ESC M / A 3, + To add to film exposure time
− To subtract from film exposure time
* To multiply film exposure time
/ To divide film exposure time
BASIC example:

```
10 Rem - Expose all colors
20 LPrint Chr$(27) + "M" + "E" + "A";
10 Rem - Expose only Red
20 LPrint Chr$(27) + "M" + "E" + "R";
10 Rem - Set film type to Kodak Ektachrome
20 LPrint Chr$(27) + "M" + "F" + "3";
10 Rem - Open the shutter ^
11 Rem - Note that we use the letter o not zero
20 LPrint Chr$(27) + "M" + "S" + "O";
10 Rem - Reset film color lookup table to defaults
20 LPrint Chr$(27) + "M" + "=";
(?) 10 Rem - Set element 7 of the film color lookup table
11 Rem to color 543, 889, 102
20 LPrint Chr$(27) + "M" + " ^ " + "543," + "889," + "102";
10 Rem - Multiply all exposure times by 18
20 LPrint Chr$(27) + "M" + "*" + "A" + "18,";
```

ESC R (c1) (c)
Set communications baud rate.
By using the following table to replace argument (c2) the user is able to change the baud rates on either serial port. To change the baud rate for SIO 0 replace argument (c1) with 0 and to change the SIO 1 baud rate replace argument (c1) with 1.

| Argument (c2) value | Baud rate |
| --- | --- |
| 0 | 110 |
| 1 | 300 |
| 2 | 600 |
| 3 | 1200 |
| 4 | 2400 |
| 5 | 4800 |
| 6 | 9600 |
| 7 | 19200 |

This command is the software equivelent of DIP Switch #2 — bits 3, 2, and 1.

Please note that the arguments to this command are characters not integers. This means that the number arguments have NO commas after them.

BASIC example:

```
10 Rem - Set the baud rate for SIO 0 to 4800 baud
20 LPrint Chr$(27) + "R" + "O" + "5";
```

ESC S (c1) (c2)
Set parity and byte width parameters for a single port.

This command allows the user to set the parity and byte length parameters for both SIO ports. The first parameter (c1) specifies the SIO port (either 0 or 1) and the second parameter (c2) is a 3 bit character that specifies the following:

| | |
| --- | --- |
| Bit 0 = Even or odd parity. | 0 = even, 1 = odd |
| Bit 1 = Purity ON or OFF. | 0 = Off, 1 = On |
| Bit 2 = Byte length of 7 or 8 bits. | 0 = 7, 1 = 8 |

This command is the software equivelent of DIP Switch #2 — bits 4, 5, and 6.

Please note that the arguments to this command are characters not integers. This means that the number arguments have NO commas after them.

BASIC example:

```
10 Rem - Set the SIO 1 port to even parity, 8 bits long
20 LPrint Chr$(27) + "S" + Chr$(6);
```

The character 6 that sets the above parameters is set up in the following way:
Bit 0=0 (even parity, bit 1 must turn it on)
Bit 1=1 (parity on since it is "even" in bit 0)
Bit 2=1 (8 bit long bytes)
The binary number 110 equals decimal 6.

```
10 Rem - Set the SIO 0 Port to no parity, 7 bits long
20 LPrint Chr$(27) + "S" + Chr$(0);
```

The character 0 that sets the above parameters is set up in the following way:
Bit 0=0 (since there is no parity this could be (either a 0 or 1)
Bit 1=0 (no parity)
Bit 2=0 (bytes are 7 bits long)
The binary number 0 equals the decimal number 0. Note that since bit 0 could have been either 0 or 1 the binary number 100 or decimal 4 would have set the same parameters.

ESC T (n1) (n2)

Make a tone (n2) for a specified length of time (n1).

This command allows the Quintar board to make different tones. The first parameter is the length of time in tenths of a second for the tone to sound. This can be from 1 to 599.

The second paramter is the pitch. The pitch is an integer from 0 to 999. The following table gives approximate pitches:

| Note | Octave | |
|------|--------|---|
|      | 1      | 2 |
| C    | 35     | 18 |
| D    | 32     | 16 |
| E    | 28     | 14 |
| F    | 27     | 13 |
| G    | 24     | 12 |
| A    | 21     | 11 |
| B    | 19     | 10 |

BASIC example:

```
10 Rem - Make a G sound in the first octave for 5.5 secs
20 LPrint Chr$(27) + "T" + "55," + "24,";
```

ESC X (c1) (c2)

Set handshaking parameter (c2) for port (c1).

This command allows the software to switch between the hardware and software handshaking modes for the two Quintar serial ports. The first parameter (c1) specifies which of the Quintar SIO ports to change (either 0 or 1) and the second parameter (c2) specifies whether to use software or hardware handshaking for that port.

For the second parameter (c2), use the letter S to specify software handshaking or the letter H to specify hardware handshaking.

BASIC example:

```
10 Rem - Set sorfware handshaking for Quintar SIO port 1
20 LPrint Chr$(27) + "X" + "1" + "S";
```

ESC Y (d)

Transmit current cursor coordinate to logical device (d).

This will currently transmit the cursor location back to the host computer or terminal attached to the main serial port of the Quintar. The number will be returned as two integers in the form XXXYYY.

The logical device parameter (d) is a dummy and must be set to 0.

BASIC example:

```
10 Rem - Get the current cursor location
11 Rem - Note that this particular example is written
12 Rem for the IBM BASIC only. To allow this to run
13 Rem with other computers change the OPEN statement
14 Rem so that it is compatible with your serial port
15 Rem
20 File.number % = 1
30 Open "COM1:96" as File.number %
40 LPrint Chr$(27) + "Y" + "0";
50 Rem
51 Rem - On the following INPUT statement we use a length
52 Rem of 6 since the coordinate pair is returned in
53 Rem the form XXXYYY which is 6 characters long.
60 Return.length % = 6
70 a$ = Input$(Return.length %, File.number %)
80 Print "The current cursor location is: "; a$
```

ESC @ (c1) (c2) {(c3)}

Get input from peripheral device.

This command allows the user to specify peripheral device input characteristics such as whether coordinates are continuously sent or if they are only sent when a button is pushed. The first parameter to this command (c1) allows the user to specify the type of device to change the parameters on, M for mouse and T for tablet.

The second parameter (c2) can be one of the following:

C Send coordinates continuously.

B Send coordinates and button only when any button is pressed.

M When this parameter is used no coordinates will be sent to the Quintar. The only action that will occur is to activate a macro which is represented by the button that is pressed. See command ESCAPE C to define these macros.

S Sent mouse sensitivity. This must be followed by an integer in the range 0 to 9. Please note that this integer is actually a character argument and therefore does not require a comma after the number.

BASIC example:

```
10 Rem - Set mouse sensitivity to 4
20 LPrint Chr$(27) + "@" + "M" + "S" + "4";
10 Rem - Allow the table to send continuous coordinates
20 LPrint Chr$(27) + "@" + "T" + "C";
```

ESC = (n)

Set number of hard copies (n) to make.

This allows the user to specify the number of hardcopies that should be made from one image.

The defualt value for (n) is 1. After (n) is changed it does not automatically reset. It will stay at it's new value until it is change with the ESC = command again.

BASIC example:

```
10 Rem - Set the number of copies to 6
20 LPrint Chr$(27) + "=" + "6,";
```

ESC ? (d) (c)

Transmit statistical information (c). (Argument (d) is a dummy and should be set to 0 always.)

The statistics command allows the user to request specific information from the Quintar. This information can be any of the following and it will always be sent back to the host computer or terminal that is attached to the main serial port (SIO 0) of the Quintar.

The following information can be returned by the Quintar:

| Argument for (c) | Action | Type of value returned |
|---|---|---|
| M | for model number | MMMM |
| R | resolution | XXXXYYYY |
| V | version number | V.VV |
| C | number of planes | CC |
| P | palette in bits | PP |
| L | Quintar logo | (note that this displays on the color CRT not the |

| Argument for (c) | Action | Type of value returned |
|---|---|---|
| | | terminal) |

BASIC example:

```
10 Rem - Display Quintar logo on CRT
20 LPrint Chr$(27) +
10 Rem - Get the version number of the Quintar
11 Rem - Note that this particular example is written
12 Rem for the IBM BASIC only. To allow this to run
13 Rem with other computers change the OPEN statement
14 Rem so that it is compatible with your serial port
15 Rem
20 File.number % = 1
30 Open "COM1:96" as File.number %
40 LPrint Chr$(27) + "?" + "V";
50 Rem
51 Rem - On the following INPUT statement we use a length
52 Rem of 4 since the version number is returned in
53 Rem the form V.VV which is 4 characters long.
60 Return.length % = 4
70 a$ = Input$(Return.length %, File.number %)
80 Print "The Quintar version number is: "; a$
10 Rem - Get the resolution of the Quintar
11 Rem - Note that this particular example is written
12 Rem for the IBM BASIC only. To allow this to run
13 Rem with other computers change the OPEN statement
14 Rem so that it is compatible with your serial port
15 Rem
20 File.number % = 1
30 Open "COM1:96" as File.number %
40 LPrint Chr$(27) + "?" + "V";
50 Rem
51 Rem - On the following INPUT statement we use a length
52 Rem of 8 since the resolution is returned in
53 Rem the form XXXXYYYY which is 8 characters long.
60 Return.length % = 8
70 a$ = Input$(Return.length %, File.number %)
80 Print "The Quintar resolution is: "; a$
```

End of ESCAPE commands

Windows, Clipping, and Wrap-Around

The windowing command allows the user to specify that only a portion of the screen be used as though it were the complete screen. While you might assume that this is silly since you can draw to any location of the screen anyway, it is actually very useful. The biggest difference comes about with window "clipping" and "wrap-around".

Clipping occurs when the complete image can't be displayed on the RGB monitor because it would go off the edge of the screen. For example if we were to draw a circle starting at (5,5) with a radius of 100 we would only be able to display part of the circle image. The rest of the image that would be displayedd off the screen is clipped or left out of the image since there is no way to display it. In this case all we would see would be an arc.

Wrap-around occurs when an image starts on the screen but continues to a position off of the screen. Wrap-around is almost the opposite of clipping. Instead of ignoring the part of the image that can't be displayed, as clipping does, wrap-around actually continues the image on the opposite side of the screen. This is as though the screen were actually a globe with the left and right sides of the screen connected and the top and bottom connected.

How do you know which image will be clipped and which will wrap-around? The answer is that any geometric shape (circle, rectangle, polygon) will be clipped while lines and dots will wrap-around.

For example a vertical line that is started at (2,500) with a length of 400 pixels will go off the top of the screen and wrap-around to the bottom and continue until all 400 pixels of it's length are displayed.

The next question probably is: how does this relate to windows? Everything about clipping and wrap-around that we have talked about so far still holds true no matter what the window size. What you will notice though is that if the window is 100 pixels square and is placed in the middle of the screen, both clipping and wrap-around will look a little funny. That is a small circle that is drawn at one corner of the window may actually get clipped if it runs past the window's edge even though by looking at the screen as a whole there should be plenty of room to display the complete circle.

The same goes for a line that may wrap around in the middle of the screen even though it appears there should be plenty of room to display the whole line.

One difference you should know about when using windows is that the starting points you send to the Quintar to begin drawing some images get automatically moved into the window area. The following table defines which starting points of which commands get moved if they are outside the window and also which commands are clipped and which commands wrap-around.

For the starting points that are moved because they are outside the window area the point is moved to the closest boundary of the window.

(?) Is the following table correct?

| Command Name | Starting Point Moved | Clipped or Wrap-around |
|---|---|---|
| Y-bar | No | Wrap-around |
| X-bar | No | Wrap-around |
| Incremental X-bar | No | Wrap-around |
| Incremental Y-bar | No | Wrap-around |
| Dot | Yes | Wrap-around |
| Incremental dot | Yes | Wrap-around |
| Vector | Yes | Wrap-around |
| Concatenated vector | Yes | Wrap-around |
| Arc | Yes | Clipped |
| Circle | Yes | Clipped |
| Rectangle | No | Clipped |
| Polygon | No | Clipped |

In addition to the above there are the following exceptions. When drawing an arc or a circle only the center point is moved, the rest of the image is clipped. In both the rectangle and polygon commands every point that you specify outside of the window is moved, not just the first point.

Please note that are fill will not work correctly with open or clipped images in a window. The filling will flow out past the window and could end up filling the entire screen. To get around this make sure that all images that you want to fill are closed.

References

In order to keep the present application within reasonable limits, already available detailed data regarding the image recorder and the graphics controller GDC 7220 have not been included in the text. Reference is made to the following publication which describes these units in detail and is available from the sources indicated:

1. A Guide to Software Creation for Polaroid Corporation's Pallette Computer Image Recorder Version 3.0, June 27, 1983, 29 pages, Polaroid Corporation.

2. Design Manual, "PD 7220/GDC Graphics Display Controller," published by NEC Electronics, USA.

These materials are attached hereto as exhibits and are incorporated herein by reference.

Lastly, it is believed that the Zilog Z280 CPU and associated computer systems and associated components as set forth herein are sufficiently well-known as to not require further amplification by inclusion of operating or user manuals or the like, the same being available from Zilog Corporation, Cupertino, Calif.

```
1:  ;*****************************************************************
2:  ;*                                                               *
3:  ;*          Make Hard Copy - ESC M (c)...                        *
4:  ;*                                                               *
5:  ;* Where: (c) = E for Expose                                     *
6:  ;*             (t) = A for All (Red, Green and Blue)             *
7:  ;*                   R for Red                                   *
8:  ;*                   G for Green                                 *
9:  ;*                   B for Blue                                  *
10: ;*           = F for Film type selection                         *
11: ;*             (n) = 1 for Polaroid 669                          *
12: ;*                   2 for Polachrome 35mm                       *
13: ;*                   3 for Kodak Ektachrome                      *
14: ;*           = S for shutter control                             *
15: ;*             (t) = O for Open shutter                          *
16: ;*                   C for Close shutter and advance film        *
17: ;*           = = to reset film table                             *
18: ;*           = + A/R/G/B for exposure offset                     *
19: ;*             (n) = 0-999 to add to current film exposure       *
20: ;*           = - A/R/G/B for exposure offset                     *
21: ;*             (n) = 0-999 to subtract from current film exposure*
22: ;*           = * A/R/G/B for exposure multiplier                 *
23: ;*             (n) = 0-999 to multiply current film exposure     *
24: ;*           = / A/R/G/B for exposure divider                    *
25: ;*             (n) = 1-999 to divide current film exposure       *
26: ;*           = ^ Change table                                    *
27: ;*             (c) = 0 - F                                       *
28: ;*                   Followed by (n1) (n2) (n3)                  *
29: ;*                                                               *
30: ;*****************************************************************
31: escmhc:
32:         call    input
33:         call    upcase
34:         cp      'E'
35:         JP      z,emcexp            ;expose?
                                        ;yes, expose
36:         cp      'F'                 ;set film type?
37:         JP      z,emcflm            ;yes, set film type
38:         cp      'S'                 ;shutter
39:         JP      z,emcsht            ;yes, do shutter
40:         cp      '='                 ;reset film table?
41:         JP      z,emcres            ;yes
42:         cp      '+'                 ;add?
43:         JP      z,emcmat            ;yes, add
44:         cp      '-'                 ;subtract?
45:         JP      z,emcmat            ;yes, subtract
46:         cp      '*'                 ;multiply?
47:         JP      z,emcmat            ;yes, multiply
48:         cp      '/'                 ;divide?
49:         JP      z,emcmat            ;yes, divide .
50:         cp      '^'                 ;change?
51:         JP      z,emchng            ;yes, change
52:         JP      beep                ;error
53:
54: emcexp:
55:         call    input
56:         call    upcase
57:         cp      'A'                 ;expose all?
58:         JP      z,emexpa            ;yes
59:         cp      'R'                 ;expose red?
60:         JP      z,emexpr            ;yes
61:         cp      'G'                 ;expose green?
```

```
 62:           JP       z,emexpg               ;yes
 63:           cp       'B'                    ;expose blue?
 64:           JP       z,emexpb               ;yes
 65:           JP       beep                   ;error
 66:
 67: ;*******************************************************************
 68: ;*                                                                 *
 69: ;*                    Expose All Colors                            *
 70: ;*                                                                 *
 71: ;*******************************************************************
 72: emexpa:
 73:           ld       hl,(copy)              ;number of copies
 74:           ld       de,(film)              ;fall thru to expose picture
 75:
 76: ;*******************************************************************
 77: ;*                                                                 *
 78: ;*                  Routine to Expose Picture                      *
 79: ;*                                                                 *
 80: ;* Enter with: HL = number of copies                               *
 81: ;*             DE = film type                                      *
 82: ;*                                                                 *
 83: ;*******************************************************************
 84: shoot:
 85:           ld       (curcop),hl
 86:           ld       (curflm),de
 87:           ld       de,0
 88:           call     comp16                 ;zero?
 89:           ret      z                      ;yes, don't do anything
 90:           ld       hl,(curflm)
 91:           ld       de,filmax
 92:           call     scomgt                 ;film ) film max?
 93:           JP       c,beep                 ;yes, error
 94:           ld       de,1
 95:           call     scomlt                 ;film ( 1?
 96:           JP       c,beep                 ;yes, error
 97:           call     actpal                 ;activate palette
 98:
 99: emexzz:
100:           call     emshto                 ;open shutter
101:           call     shexpr                 ;do red
102:           call     shexpg                 ;do green
103:           call     shexpb                 ;do blue
104:           call     emshtc                 ;close shutter
105:
106:           ld       a,'M'                  ;move filter to reset position
107:           call     outs1
108:           ld       a,'0'
109:           call     outs1
110:           call     waits1
111:
112:           ld       hl,(curcop)            ;restore number of copies
113:           dec      hl                     ;count down
114:           ld       (curcop),hl
115:           ld       de,0
116:           call     comp16                 ;zero?
117:           ret      z                      ;yes, done
118:           jr       emexzz                 ;no, repeat
119:
120: ;*******************************************************************
121: ;*                                                                 *
122: ;*                        Expose Red                               *
123: ;*                                                                 *
124: ;*******************************************************************
125: emexpr:                                   ;do red
126:           ld       de,(film)
127:           ld       (curflm),de
128:                                           ;fall thru to shoot red
```

```
129: ;*************************************************************
130: ;*                                                             *
131: ;*                      Shoot Red                              *
132: ;*                                                             *
133: ;* Enter with: curflm set to film type                         *
134: ;*                                                             *
135: ;*************************************************************
136: shexpr:
137:        ld       a,'M'                   ;move to red filter
138:        call     outs1
139:        ld       a,'1'
140:        call     outs1
141:        call     waits1
142:        call     lutmrg                  ;move red to green
143:        call     emgtex                  ;get exposure value
144:        call     expose                  ;expose blue
145:        call     lutres                  ;reset LUT
146:        jp       lutdo                   ;and show it
147:
148: ;*************************************************************
149: ;*                                                             *
150: ;*                    Expose Green                             *
151: ;*                                                             *
152: ;*************************************************************
153: emexpg:                                  ;do green
154:        ld       de,(film)
155:        ld       (curflm),de
156:                                          ;fall thru to shoot green
157: ;*************************************************************
158: ;*                                                             *
159: ;*                     Shoot Green                             *
160: ;*                                                             *
161: ;*************************************************************
162: shexpg:
163:        ld       a,'M'                   ;move to green filter
164:        call     outs1
165:        ld       a,'2'
166:        call     outs1
167:        call     waits1
168:        call     lutmgg                  ;move green to green
169:        call     emgtex                  ;get exposure value
170:        inc      hl
171:        inc      hl
172:        call     expose                  ;expose blue
173:        call     lutres                  ;reset LUT
174:        jp       lutdo                   ;and show it
175:
176: ;*************************************************************
177: ;*                                                             *
178: ;*                     Expose Blue                             *
179: ;*                                                             *
180: ;*************************************************************
181: emexpb:                                  ;do blue
182:        ld       de,(film)
183:        ld       (curflm),de
184:                                          ;fall thru to shoot red
185: ;*************************************************************
186: ;*                                                             *
187: ;*                     Shoot Blue                              *
188: ;*                                                             *
189: ;*************************************************************
190: shexpb:
191:        ld       a,'M'                   ;move to blue filter
192:        call     outs1
193:        ld       a,'3'
194:        call     outs1
195:        call     waits1
196:        call     lutmbg                  ;move blue to green
197:        call     emgtex                  ;get exposure value
198:        inc      hl
199:        inc      hl
200:        inc      hl
```

```
201:            inc     hl
202:            call    expose              ;expose blue
203:            call    lutres              ;reset LUT
204:            jp      lutdo               ;and show it
205:
206: ;********************************************************************
207: ;*                                                                  *
208: ;*          Supporting Routines for Expose                          *
209: ;*                                                                  *
210: ;********************************************************************
211: emgtex:                                 ;routine to get address of exposure
212:            ld      hl,(curflm)         ;get film type
213:            dec     hl
214: emgtsp:                                 ;special entry point
215:            sla     l
216:            rl      h
217:            ld      de,flmrmt
218:            add     hl,de
219:            push    hl
220:            pop     iy
221:            ld      l,(iy)
222:            ld      h,(iy+1)
223:            ret
224:
225: emcflm:                                 ;set film type
226:            call    getnum
227:            call    resbct
228:            call    speck
229:            ret     c
230:            ld      de,1
231:            call    scomlt              ;film < 1?
232:            jp      c,beep              ;yes, error
233:            ld      de,filmax
234:            call    scomgt              ;film > filmax?
235:            jp      c,beep              ;yes, error
236:            ld      (film),hl           ;save film type
237:            call    setmir              ;set mirror flag
238:            ret
239:
240: emcsht:
241:            call    input
242:            call    upcase
243:            cp      'O'
244:            jr      z,emshto            ;open shutter
245:            cp      'C'
246:            jr      z,emshtc            ;close shutter
247:            jp      beep                ;error
248:
249: emshto:
250:            ld      a,'S'               ;open shutter
251:            call    outs1
252:            jp      waits1
253:
254: emshtc:
255:            ld      a,'T'               ;close shutter
256:            call    outs1
257:            jp      waits1
258:
259: emcres:                                 ;reset
260:            ld      hl,(film)           ;get address of table
261:            dec     hl
262: emrent:                                 ;special entry point
263:            push    hl
264:            sla     l
265:            rl      h
266:            ld      de,flmtbl
267:            add     hl,de
268:            push    hl
269:            pop     iy
270:            ld      l,(iy)
```

```
271:            ld      h,(iy+1)
272:            ex      de,hl
273:            pop     hl
274:            push    de
275:            call    emgtsp              ;get address of ram area
276:            pop     iy
277:            ld      b,96
278: emcrsr:
279:            ld      a,(iy)
280:            ld      (hl),a
281:            inc     iy
282:            inc     hl
283:            djnz    emcrsr
284:            ret
285:
286: emresa:                                ;routine to reset all tables
287:            ld      hl,0
288:            call    emrent
289:            ld      hl,1
290:            call    emrent
291:            ld      hl,2
292:            jp      emrent
293:
294: emcmat:                                ;math command
295:            ld      (ramx),a            ;save math command
296:            call    input               ;get A/R/G/B.
297:            call    upcase
298:            ld      (ramx+1),a          ;save color
299:            call    getnum
300:            call    resbct
301:            call    speck
302:            ret     c
303:            ld      (ramy),hl           ;save value
304:            call    emgtex              ;get address of ram table in HL
305:            push    hl
306:            pop     iy                  ;IY=HL
307:            ld      a,(ramx+1)          ;restore color
308:            cp      'A'                 ;all?
309:            jr      z,emcmta            ;yes
310:            cp      'R'                 ;red?
311:            jr      z,emath             ;yes
312:            cp      'G'                 ;green?
313:            jr      z,emcmtg            ;yes
314:            cp      'B'                 ;blue
315:            jr      z,emcmtb            ;yes
316:            jp      beep                ;no, error
317:
318: emcmta:                                ;all
319:            push    iy
320:            call    emath               ;do red
321:            pop     iy
322:            push    iy
323:            call    emcmtg              ;do green
324:            pop     iy
325:            jp      emcmtb              ;do blue
326:
327: emcmtg:
328:            inc     iy
329:            inc     iy
330:            jr      emath               ;do math
331:
332: emcmtb:
333:            ld      bc,4
334:            add     iy,bc
335: emath:
336:            ld      b,16                ;counter
337: emathr:
338:            push    bc                  ;save counter
339:            ld      l,(iy)              ;get table value
340:            ld      h,(iy+1)
341:            ld      a,(ramx)            ;get math command
342:            cp      '+'
```

```
343:            jr      z,ematha
344:            cp      '-'
345:            jr      z,emaths
346:            cp      '*'
347:            jr      z,emathm
348:                                            ;assume /
349:            ld      bc,(ramy)
350:            ld      de,0
351:            call    idiv                    ;divide table / value
352:            ld      (iy),e                  ;save new answer
353:            ld      (iy+1),d
354:            jr      emathd                  ;done
355:
356: ematha:                                    ;add
357:            ld      de,(ramy)               ;table + value
358:            add     hl,de
359:            jr      emathx
360:
361: emaths:                                    ;subtract
362:            ld      de,(ramy)
363:            or      a
364:            sbc     hl,de                   ;table - value
365:            jr      emathx
366:
367: emathm:                                    ;multiply
368:            ex      de,hl                   ;DE=table
369:            ld      bc,(ramy)               ;BC=value
370:            call    imult                   ;DEHL=table * value
371: emathx:
372:            ld      (iy),l
373:            ld      (iy+1),h                ;save answer
374: emathd:
375:            ld      bc,6
376:            add     iy,bc
377:            pop     bc                      ;restore counter
378:            djnz    emathr                  ;loop
379:            ret
380:
381: emchng:                                    ;change table
382:            call    input
383:            call    hexdig                  ;get hex digit
384:            jp      c,beep                  ;ignore if illegal
385:            ld      e,a
386:            ld      d,0
387:            ld      bc,6
388:            call    imult                   ;HL=offset * 6
389:            ex      de,hl                   ;DE=HL
390:            push    de                      ;save offset
391:            call    emgtex                  ;get address of film ram in HL
392:            ex      de,hl                   ;DE=address
393:            pop     iy                      ;restore offset
394:            add     iy,de                   ;add address to offset
395:            ld      b,3
396: emclac:
397:            push    iy
398:            push    bc
399:            call    getnum
400:            call    resbct
401:            call    speck
402:            pop     bc
403:            pop     iy
404:            ret     c
405:            ld      (iy),l
406:            ld      (iy+1),h
407:            inc     iy
408:            inc     iy
409:            djnz    emclac
410:            ret
```

```
411:
412: ;*******************************************************************
413: ;*                                                                 *
414: ;*              Supporting Routines for ESC M                      *
415: ;*                                                                 *
416: ;*******************************************************************
417: waits1:                                 ;wait for ready
418:           ld       a,cr
419:           call     outs1
420:           call     clrclc               ;clear control-c flag
421: watsl1:
422:           call     cntrlc               ;control-c?
423:           ret      nz                   ;yes, exit
424:           call     inps1c               ;input ready?
425:           jr       z,watsl1             ;no, loop
426:           ret
427:
428: expose:                                 ;expose film
429:           ld       (expadd),hl          ;save exposure address
430:           ld       hl,0                 ;set last time count to 0
431:           ld       (lstime),hl
432:           xor      a                    ;LUT value counter
433:           ld       (lutvct),a
434:           ld       a,lutsiz             ;get LUT size
435:           ld       (lutcnt),a           ;loop counter
436:           call     lutclr               ;clear show LUT
437: expsrp:
438:           ld       hl,lutpal
439:           ld       iy,lutsw2
440:           ld       a,(lutvct)           ;current LUT threshhold value
441:           ld       c,a
442:           ld       b,lutsiz
443: explop:
444:           ld       a,(hl)               ;get value from palette LUT
445:           cp       c                    ;less than current value?
446:           ld       a,0                  ;force max
447:           jr       nc,expsmd            ;no, store
448:           ld       a,0fh                ;yes, store minimum
449: expsmd:
450:           ld       d,a
451:           ld       a,(iy)
452:           and      0f0h                 ;mask off green
453:           or       d                    ;merge with palette green
454:           ld       (iy),a
455:           inc      hl
456:           inc      iy
457:           djnz     explop
458:           call     lutdo                ;move show LUT to HW LUT
459:
460:           ld       hl,(expadd)
461:           push     hl
462:           ld       de,6
463:           add      hl,de
464:           ld       (expadd),hl          ;point to next exposure
465:           pop      iy
466:           ld       l,(iy)
467:           ld       h,(iy+1)
468:           ld       de,(lstime)          ;get last time exposure value
469:           ld       (lstime),hl          ;save new value
470:           or       a
471:           sbc      hl,de
472:           ld       de,0
473:           call     comp16               ;no time difference?
474:           jr       z,expnxt             ;yes, skip exposure
475:
476:           push     hl
477:           ld       a,'E'                ;expose command
478:           call     outs1
479:           pop      hl
480:           call     decot1
481:           call     waits1
```

```
482: expnxt:
483:        ld      a,(lutvct)
484:        inc     a
485:        ld      (lutvct),a
486:        ld      a,(lutcnt)              ;loop counter
487:        dec     a
488:        ld      (lutcnt),a
489:        jp      nz,expsrp
490:        ret
491:
492: lutclr:                                ;clear show LUT to black
493:        ld      hl,lutsw1
494:        ld      de,lutsw2
495:        ld      b,lutsiz
496:        ld      a,0ffh
497: lutcrp:
498:        ld      (hl),a
499:        ld      (de),a
500:        inc     hl
501:        inc     de
502:        djnz    lutcrp
503:        ret
504:
505: lutmrg:                                ;move LUT RAM red to palette LUT
506:        ld      hl,lutr1r
507:        bit     lutshw,(ix+prcflg)      ;showing LUT RAM 1?
508:        jr      z,ltmrgs                ;yes, skip
509:        ld      hl,lutr2r               ;no, use LUT RAM 2
510: ltmrgs:
511:        ld      de,lutpal
512:        ld      b,lutsiz
513: ltmrgl:
514:        ld      a,(hl)
515:        ld      (de),a
516:        inc     hl
517:        inc     de
518:        djnz    ltmrgl
519:        ret
520:
521: lutmgg:                                ;move LUT RAM green to palette LUT
522:        ld      hl,lutr1g
523:        bit     lutshw,(ix+prcflg)      ;showing LUT RAM 1?
524:        jr      z,ltmggs                ;yes, skip
525:        ld      hl,lutr2g               ;no, use LUT RAM 2
526: ltmggs:
527:        ld      de,lutpal
528:        ld      b,lutsiz
529: ltmggl:
530:        ld      a,(hl)
531:        ld      (de),a
532:        inc     hl
533:        inc     de
534:        djnz    ltmggl
535:        ret
536:
537: lutmbg:                                ;move LUT RAM blue to palette LUT
538:        ld      hl,lutr1b
539:        bit     lutshw,(ix+prcflg)      ;showing LUT RAM 1?
540:        jr      z,ltmbgs                ;yes, skip
541:        ld      hl,lutr2b               ;no, use LUT RAM 2
542: ltmbgs:
543:        ld      de,lutpal
544:        ld      b,lutsiz
545: ltmbgl:
546:        ld      a,(hl)
547:        ld      (de),a
548:        inc     hl
549:        inc     de
550:        djnz    ltmbgl
```

```
551:            ret
552:
553:
554:
555: flmtbl:                                        ;hard coded table pointers
556:            dw      flmtb1                      ;Polaroid 669 film
557:            dw      flmtb2                      ;Polaroid Polachrome
558:            dw      flmtb3                      ;Kodak Ektachrome
559:            dw      flmtb4
560:            dw      flmtb5
561: filmax equ         ($-flmtbl)/2
562: flmrmt:                                        ;ram table pointers
563:            dw      flmrm1
564:            dw      flmrm2
565:            dw      flmrm3
566:            dw      flmrm4
567:            dw      flmrm5
568: flmtb1:            ; R      G      B           ;Polaroid 669 film type
569:            if      oldcod
570:            dw      0000, 0000, 0000            ;0
571:            dw      0010, 0008, 0005            ;1
572:            dw      0014, 0010, 0006            ;2
573:            dw      0018, 0013, 0008            ;3
574:            dw      0025, 0016, 0010            ;4
575:            dw      0033, 0021, 0012            ;5
576:            dw      0045, 0026, 0015            ;6
577:            dw      0061, 0033, 0019            ;7
578:            dw      0082, 0042, 0024            ;8
579:            dw      0111, 0053, 0030            ;9
580:            dw      0150, 0067, 0037            ;10
581:            dw      0203, 0084, 0047            ;11
582:            dw      0274, 0106, 0058            ;12
583:            dw      0370, 0134, 0073            ;13
584:            dw      0500, 0169, 0091            ;14
585:            dw      0675, 0214, 0114            ;15
586:            endif
587:
588:            dw      0000, 0000, 0000            ;0
589:            dw      0020, 0008, 0010            ;1
590:            dw      0024, 0010, 0012            ;2
591:            dw      0036, 0013, 0016            ;3
592:            dw      0050, 0016, 0020            ;4
593:            dw      0066, 0021, 0024            ;5
594:            dw      0090, 0026, 0030            ;6
595:            dw      0122, 0033, 0038            ;7
596:            dw      0164, 0042, 0048            ;8
597:            dw      0222, 0053, 0060            ;9
598:            dw      0300, 0067, 0074            ;10
599:            dw      0406, 0084, 0094            ;11
600:            dw      0548, 0106, 0116            ;12
601:            dw      0740, 0134, 0146            ;13
602:            dw      1000, 0169, 0182            ;14
603:            dw      1350, 0214, 0228            ;15
604:
605: flmtb2:            ; R      G      B           ;Polaroid Polachrome 35mm type
606:            if      oldcod
607:            dw      0000, 0000, 0000            ;0
608:            dw      0003, 0002, 0002            ;1
609:            dw      0004, 0002, 0003            ;2
610:            dw      0006, 0003, 0004            ;3
611:            dw      0008, 0004, 0006            ;4
612:            dw      0010, 0006, 0007            ;5
613:            dw      0014, 0008, 0010            ;6
614:            dw      0019, 0010, 0012            ;7
615:            dw      0025, 0014, 0016            ;8
616:            dw      0034, 0018, 0021            ;9
617:            dw      0046, 0024, 0028            ;10
618:            dw      0062, 0033, 0036            ;11
619:            dw      0083, 0043, 0047            ;12
620:            dw      0112, 0058, 0062            ;13
621:            dw      0151, 0077, 0081            ;14
```

```
622:        dw      0203,0102,0106          ;15
623:        endif
624:
625:        dw      0000,0000,0000          ;0
626:        dw      0005,0003,0006          ;1
627:        dw      0006,0003,0009          ;2
628:        dw      0009,0005,0012          ;3
629:        dw      0012,0006,0018          ;4
630:        dw      0015,0009,0021          ;5
631:        dw      0021,0012,0030          ;6
632:        dw      0029,0015,0036          ;7
633:        dw      0038,0021,0048          ;8
634:        dw      0051,0027,0063          ;9
635:        dw      0069,0036,0084          ;10
636:        dw      0093,0050,0108          ;11
637:        dw      0125,0065,0141          ;12
638:        dw      0168,0087,0186          ;13
639:        dw      0227,0116,0243          ;14
640:        dw      0305,0153,0318          ;15
641:
642: flmtb3:        ;  R    G    B           ;Kodak Ektachrome film type
643:        if      oldcod
644:        dw      0000,0000,0000          ;0
645:        dw      0002,0001,0001          ;1
646:        dw      0004,0001,0001          ;2
647:        dw      0005,0001,0001          ;3
648:        dw      0007,0002,0002          ;4
649:        dw      0010,0002,0002          ;5
650:        dw      0015,0003,0004          ;6
651:        dw      0021,0005,0005          ;7
652:        dw      0030,0007,0007          ;8
653:        dw      0042,0010,0010          ;9
654:        dw      0060,0014,0014          ;10
655:        dw      0086,0019,0020          ;11
656:        dw      0122,0027,0028          ;12
657:        dw      0174,0038,0040          ;13
658:        dw      0249,0054,0056          ;14
659:        dw      0354,0076,0079          ;15
660:        endif
661:
662:        dw      0000,0000,0000          ;0
663:        dw      0002,0001,0003          ;1
664:        dw      0004,0001,0004          ;2
665:        dw      0005,0001,0005          ;3
666:        dw      0007,0002,0006          ;4
667:        dw      0010,0002,0008          ;5
668:        dw      0015,0003,0011          ;6
669:        dw      0021,0005,0014          ;7
670:        dw      0030,0007,0019          ;8
671:        dw      0042,0010,0028          ;9
672:        dw      0060,0014,0039          ;10
673:        dw      0086,0019,0055          ;11
674:        dw      0122,0027,0077          ;12
675:        dw      0174,0038,0110          ;13
676:        dw      0249,0054,0154          ;14
677:        dw      0354,0076,0217          ;15
678:
679: flmtb4:        ;  R    G    B           ;
680:        dw      0000,0000,0000          ;0
681:        dw      0002,0001,0003          ;1
682:        dw      0004,0001,0003          ;2
683:        dw      0005,0001,0003          ;3
684:        dw      0007,0002,0006          ;4
685:        dw      0010,0002,0006          ;5
686:        dw      0015,0003,0011          ;6
687:        dw      0021,0005,0014          ;7
688:        dw      0030,0007,0019          ;8
689:        dw      0042,0010,0028          ;9
690:        dw      0060,0014,0039          ;10
691:        dw      0086,0019,0055          ;11
```

```
692:        dw        0122,0027,0077        ;12
693:        dw        0174,0038,0110        ;13
694:        dw        0249,0054,0154        ;14
695:        dw        0354,0076,0217        ;15
696:
697: flmtb5:                  ; R    G    B     ;
698:        dw        0000,0000,0000        ;0
699:        dw        0002,0001,0003        ;1
700:        dw        0004,0001,0003        ;2
701:        dw        0005,0001,0003        ;3
702:        dw        0007,0002,0006        ;4
703:        dw        0010,0002,0006        ;5
704:        dw        0015,0003,0011        ;6
705:        dw        0021,0005,0014        ;7
706:        dw        0030,0007,0019        ;8
707:        dw        0042,0010,0028        ;9
708:        dw        0060,0014,0039        ;10
709:        dw        0086,0019,0055        ;11
710:        dw        0122,0027,0077        ;12
711:        dw        0174,0038,0110        ;13
712:        dw        0249,0054,0154        ;14
713:        dw        0354,0076,0217        ;15
```

What is claimed is:

1. A digital film recorder adapted to receive high level digital commands containing color graphic instructions from a host computer or terminal lacking color graphics capability comprising:

an analog film recorder, graphics display generator means for converting high level digital commands into a drive signal for said analog film recorder, and means for combining said analog film recorder and said graphic display generator means into one unit operating from said high level digital commands.

2. A graphics peripheral for use with a source computer or terminal for generating a set of high level commands containing graphic instructions and an expose command in digital form, comprising an analog film recorder, graphics display generator means for converting said high level digital commands into a drive signal for said analog film recorder, including means for storing predetermined film exposure values and means for exposing film in said analog film recorder according to said film exposure values, and only digital cable means for interconnecting said source to said graphics display generator means.

3. The peripheral as in claim 2 wherein said display generator means includes a CPU with associated ROM and RAM, graphics display controller means, pixel display memory, said means for storing film exposure values including lookup table memory means for storing predetermined color and intensity selections of the user.

4. The peripheral as in claim 3 in which said display controller means takes commands from said source converts vector information to pixel information and thereafter draws and writes the same into display memory.

5. The peripheral as in claim 3 further including a set of graphics commands stored in ROM for generating low level language pixel data in graphics and selected character fonts in response to higher level instructions.

6. The peripheral as in claim 3 in which said CPU, graphics display generator means and lookup table rotate the RGB signal in time, and wherein said lookup table is storing either red, green, or blue, means for synchronizing the color wheels to interpose the corresponding color in the light path as the data for red, green or blue is transmitted.

7. Peripheral as in claim 6 further including means for developing control signals for selecting film type.

8. The peripheral as in claim 6 further including means for developing control signals for exposing the film in accordance with its color sensitivity.

9. A graphics peripheral for use with a source computer or terminal for generating a set of high level commands containing graphic instructions and an expose command in digital form, comprising an analog film recorder, graphics display generator means for converting said high level digital commands into a drive signal for said analog film recorder, means for combining said analog film recorder and said graphics display generator means into one unit operating from said high level digital commands; and only digital cable means for interconnecting said source to said graphics display generator means.

10. A peripheral terminal for converting high level language output from an external computer to a film exposure thereof without generating a full real time image using an analog film recorder (AFR) including a camera, a CRT display, and a color wheel arranged in the light path between the camera and display, comprising peripheral computer means including ROM and RAM and at least one input port constructed and arranged for receiving high level digital data from said external computer, first memory means wherein each pixel value has predetermined locations, graphic controller means (GCD) connected to the output of said peripheral computer means and to the input of said memory means, second memory means forming a lookup table for storing the color value corresponding to a range of selected values, means for looking up each said pixel value in the lookup table and for delivering a digital output signal corresponding to the looked up value, means for converting said digital output signal into an analog video signal, said computer means further including control output for establishing the color values stored in said memory lookup table, a second control output for synchronizing and advancing the color wheel movement, and a third control output for frame and pixel sync, said control outputs being connected to said AFR.

11. The peripheral as in claim 10, including means for combining said AFR, CRT display, color wheel, peinstructions from a host computer or terminal lacking color graphics capability, the improvement comprising in combination the steps of:

interpreting said commands to produce a graphic object and its color representation for developing a separate raster signal, writing the graphic object and color representations into a graphic memory means, storing predetermined values of color and intensity in a lookup table, mapping the memory contents through the lookup table and a DAC to develop a color video signal and sync signal, applying said video signal and sync signal to a CRT, photographing the CRT to produce a color image on film.

ripheral computer means, first memory means, graphic controller means, second memory means, said looking up means, said converting means and said control outputs into one unit operating from said high level digital commands.

12. In a method for generating a graphic display from high level digital commands containing color graphic

13. The method as in claim 12, further including the step of:

effecting said interpreting, writing, storing, mapping, applying, and photographing steps in a single stand alone peripheral to which said high level commands are applied only in digital form.

14. The peripheral as in claim 12, wherein said graphic display generator means include means for storing predetermined film exposure values and means for exposing film in said analog film recorder according to said film exposure values.

* * * * *